(12) United States Patent
Komma

(10) Patent No.: US 7,443,778 B2
(45) Date of Patent: Oct. 28, 2008

(54) OPTICAL HEAD DEVICE AND OPTICAL INFORMATION DEVICE USING THE SAME, COMPUTER, OPTICAL DISK PLAYER, CAR NAVIGATION SYSTEM, OPTICAL DISK RECORDER, AND OPTICAL DISK SERVER

(75) Inventor: Yoshiaki Komma, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 670 days.

(21) Appl. No.: 10/789,309

(22) Filed: Feb. 26, 2004

(65) Prior Publication Data

US 2004/0170106 A1    Sep. 2, 2004

(30) Foreign Application Priority Data

Feb. 27, 2003    (JP)    ............... 2003-050845

(51) Int. Cl.
*G11B 7/135*    (2006.01)
*G11B 7/00*    (2006.01)

(52) U.S. Cl. ............... 369/112.1; 369/112.08
(58) Field of Classification Search ........ None
See application file for complete search history.

(56) References Cited

U.S. PATENT DOCUMENTS

| | | | | |
|---|---|---|---|---|
| 5,111,448 A | * | 5/1992 | Komma et al. | ........... 369/44.23 |
| 5,289,451 A | * | 2/1994 | Ashinuma et al. | ........ 369/47.55 |
| 5,446,565 A | | 8/1995 | Komma et al. | |
| 5,513,164 A | * | 4/1996 | Tanaka et al. | ............... 369/53.2 |
| 6,084,843 A | | 7/2000 | Abe et al. | |

(Continued)

FOREIGN PATENT DOCUMENTS

EP    0 610 055    8/1994

(Continued)

OTHER PUBLICATIONS

European Search Report mailed Sep. 25, 2006 for co-pending EP application 03013076.9.

(Continued)

*Primary Examiner*—Joseph Feild
*Assistant Examiner*—Parul Gupta
(74) *Attorney, Agent, or Firm*—Hamre, Schumann, Mueller & Larson, P.C.

(57) ABSTRACT

It is an object of the present invention to record to and reproduce different types of optical disks using light beams with different wavelengths. In an optical head device for recording to and reproducing high-density optical disks using an objective lens with a large NA, a sawtooth-shaped hologram is used for recording to and reproducing conventional optical disks such as DVDs. For blue light, a sawtooth height is the light path length $2\lambda$, and second-order diffraction light is used. Red light generates first-order diffraction. The hologram is blazed and has convex lens function, and corrects chromatic aberration of the refractive lens. A relay lens is disposed between an infrared laser light source and the objective lens, and the light beam that is emitted from the infrared laser light source is substantially converged by the relay lens, and then, as it diverges once again, it is incident on the objective lens, which focuses the light beam into a spot on the recording surface of an optical disk after passing through an approximately 1.2 mm substrate.

19 Claims, 13 Drawing Sheets

U.S. PATENT DOCUMENTS

| | | | |
|---|---|---|---|
| 6,118,594 A | 9/2000 | Maruyama | |
| 6,166,854 A | 12/2000 | Katsuma | |
| 6,201,780 B1 | 3/2001 | Katayama | |
| 6,285,646 B1 * | 9/2001 | Yoo et al. | 369/112.26 |
| 6,442,124 B1 | 8/2002 | Chung et al. | |
| 6,449,095 B1 | 9/2002 | Ohtaki et al. | |
| 6,515,805 B2 * | 2/2003 | Hagimori | 359/691 |
| 6,760,295 B1 | 7/2004 | Maruyama | |
| 6,834,036 B1 | 12/2004 | Shiono et al. | |
| 6,898,168 B2 | 5/2005 | Kimura et al. | |
| 6,928,035 B2 | 8/2005 | Komma et al. | |
| 6,992,967 B2 * | 1/2006 | Jeong | 369/112.1 |
| 7,190,650 B2 * | 3/2007 | Fujiune et al. | 369/53.22 |
| 2001/0000135 A1 | 4/2001 | Mori et al. | |
| 2003/0151996 A1 * | 8/2003 | Hendriks et al. | 369/53.2 |
| 2003/0227858 A1 * | 12/2003 | Komma | 369/112.08 |
| 2004/0090901 A1 * | 5/2004 | Katayama | 369/112.24 |
| 2004/0109242 A1 * | 6/2004 | Komma et al. | 359/738 |
| 2005/0152036 A1 | 7/2005 | Shiono et al. | |
| 2005/0249099 A1 | 11/2005 | Komma | |

FOREIGN PATENT DOCUMENTS

| | | |
|---|---|---|
| EP | 0 731 459 | 9/1996 |
| EP | 0 747 893 | 12/1996 |
| EP | 0 831 466 | 3/1998 |
| EP | 0 936 604 | 8/1999 |
| EP | 1 001 414 | 5/2000 |
| EP | 1 500 956 | 1/2005 |
| JP | 7-98431 | 4/1995 |
| JP | 9-306018 | 11/1997 |
| JP | 10-106016 | 4/1998 |
| JP | 10-334504 | 12/1998 |
| JP | 11-23819 | 1/1999 |
| JP | 11-296890 | 10/1999 |
| JP | 11-339307 | 12/1999 |
| JP | 2000-81566 | 3/2000 |
| JP | 2000-260056 | 9/2000 |
| JP | 2001-6203 | 1/2001 |
| JP | 2001-43559 | 2/2001 |
| JP | 2001-60336 | 3/2001 |
| JP | 2001-93179 | 4/2001 |
| JP | 2001-209966 | 8/2001 |
| JP | 2002-237078 | 8/2002 |
| WO | WO 02/21522 | 3/2002 |
| WO | 02/082437 | 10/2002 |
| WO | WO 03/060891 | 7/2003 |

OTHER PUBLICATIONS

Nishioka, et al., "BD/DVD/CD Compatible Optical Pick-up Technology", Extend Abstracts (The 50th Spring Meeting 2003); The Japan Society of Applied Physics and Related Societies, 27 p-ZW-10, Kanagawa University, Mar. 2003 (with partial translation).

Katayama, et al., "Dual Wavelength Optical Head for 0.6mm and 1.2mm Substrate Thickness", Jpn. J. Appl. Phys., vol. 36 (1997) pp. 460-466.

Ryuichi Katayama, et al., "Blue/DVD/CD Compatible Optical Head with Three Wavelengths and a Wavelength Selective Filter", ISOM2001, Technical Digest, We-C-05, pp. 30.

N. Kaiho, et al., "DVD/CD Compatibility using Blu-ray Disc Pick Up", Extended Abstracts (The 63rd Autumn Meeting, 2002); The Japan Society of Applied Physics, No. 3, Sep. 2002, 27p-YD-5, pp. 1008 (with partial translation).

Japanese Office Action for the co-pending JP 2004-366492, mailed Feb. 27, 2007.

Japanese Office Action for the co-pending JP 2003-139347, mailed Feb. 22, 2007.

* cited by examiner

OPTICAL HEAD DEVICE AND OPTICAL INFORMATION DEVICE USING THE SAME, COMPUTER, OPTICAL DISK PLAYER, CAR NAVIGATION SYSTEM, OPTICAL DISK RECORDER, AND OPTICAL DISK SERVER

BACKGROUND OF THE INVENTION

1. Field of the Invention

The present invention relates to optical head devices and optical information devices (optical information devices) for recording, reproducing, and erasing information stored on an optical information medium such as an optical disk, recording and reproducing methods for optical information devices, systems in which the same are adopted, and objective lenses, diffraction elements, and composite objective lenses, in which an objective lens and a diffraction element are combined, used in optical head devices.

2. Description of the Related Art

Optical memory technologies that employ optical disks having a pit-shaped pattern as high-density, large-capacity storage media have found increasing application, and have been put to practical use for digital audio disks, video disks, text file disks, and data files. The functions that allow such applications to be executed successfully with high reliability with respect to recording and reproducing information to and from an optical disk using a finely focused light beam can be broadly divided into a light-focusing function for forming fine spots at the diffraction limit, the focus controls (focus servo) and the tracking controls of the optical system, and the detection of pit signals (information signals).

Recent advances in optical system design technologies and the development of shorter wavelength semiconductor lasers as light sources have led to progress in the development of optical disks having storage capacities with a higher density than was the case conventionally. Increasing the numerical aperture (NA) on the optical disk side of the light-focusing optical system for finely focusing a light beam onto an optical disk has been investigated as one way to achieve higher densities. The problem with this is that it increases the amount of aberration that is generated due to tilting of the optical axis. When the NA is increased there is greater aberration generated with respect to the tilt. The thickness of the substrate of the optical disk (the substrate thickness) can be reduced to prevent this.

Compact disks (CDs), which may be considered the first generation of optical disks, use infrared light (wavelength $\lambda 3$ of 780 nm to 820 nm) and an objective lens with an NA of 0.45, and the substrate thickness of the disks is about 1.2 mm. DVDs, the second generation of optical disks, use red light (wavelength $\lambda 2$ of 630 nm to 680 nm; standard wavelength 650 nm) and an objective lens with an NA of 0.6, and the substrate thickness of the disks is 0.6 mm. A third generation of optical disks uses blue light (wavelength $\lambda 1$ of 390 nm to 415 nm; standard wavelength 405 nm) and an objective lens with an NA of 0.85, and the substrate thickness of the disks is 0.1 mm.

It should be noted that in this specification the substrate thickness designates the thickness from the surface where the light beam is incident on the optical disk (or information medium) to the information recording surface.

Thus, the thickness of the substrate of high-density optical disks has been reduced. Taking into account the price and the space occupied by the device, it is preferable that optical information devices can both record to and reproduce from a plurality of different types of optical disks with different substrate thicknesses and recording densities. This requires an optical head device that is provided with a light-focusing optical system that is capable of focusing a light beam down to the diffraction limit onto optical disks having different substrate thicknesses.

To record to and reproduce from disks with thicker substrates, it is necessary to focus the light beam onto a recording surface that is deeper than the disk surface, and thus the focal point must be made longer.

JP H7-98431A (Patent Document 1) (FIG. 1) discloses a configuration aimed at achieving an optical head device that records to and reproduces from a plurality of different types of optical disks with different substrate thicknesses. This serves as a first conventional example, and is described using FIG. 11A and FIG. 11B. Reference numeral 40 denotes an objective lens and 41 denotes a hologram. The hologram 41 is constituted by a substrate that is transparent to an incident light beam 44, and its grating pattern is made of concentric circles.

The objective lens 40 has a numerical aperture NA of at least 0.6, and as shown in FIG. 11A, it has been configured so that a zero-order diffraction beam 42 that has passed through the hologram 41 without being diffracted can be turned into a focus spot at the diffraction limit on an optical disk 10, which has a substrate thickness (t2) of 0.6 mm, for example. FIG. 11B shows how a focus spot can be formed at the diffraction limit on an optical disk 11, which has a thick substrate (thickness t1=1.2 mm). Positive first-order diffraction light 43 that has been diffracted by the hologram 41 is focused onto the optical disk 11 by the objective lens 40. Here, the positive first-order diffraction light 43 is subjected to aberration correction so that it passes through the substrate with the thickness t1 and is focused to the diffraction limit.

Combining the hologram 41, which diffracts the incident light, and the objective lens 40 in this manner allows a double focus lens that utilizes the diffraction light beams 42 and 43, which have different orders, to form focus spots that are focused down to the diffraction limit on the optical disks 10 and 11, respectively, which have different substrate thicknesses (t1 and t2), to be achieved. Apart from the above description, Patent Document 1 also discloses the reduction of focal position fluctuation with respect to wavelength fluctuation when recording to and reproducing from the optical disk 10, which has the thickness t2, by giving the hologram 41 a convex lens effect so as to use the zero-order diffraction light for the optical disk 11 whose thickness is t1, and use the positive first-order diffraction light for the optical disk 10 whose thickness is t2.

In addition to the above, there also has been disclosed a configuration whose object is to allow different types of optical disks to be interchangeably reproduced using a plurality of light beams with different wavelengths. A configuration in which a wavelength selection phase plate is combined with an objective lens is disclosed in JP H10-334504A (pages 7 to 9, FIGS. 1 to 4) (Patent Document 2) and in ISOM2001 Technical Digest Session We-C-05 (Proceedings, page 30) (non-Patent Document 1), and serves as a second conventional example. The configuration disclosed in non-Patent Document 1 is described using FIG. 12 and FIG. 13. FIG. 12 schematically shows the configuration of a conventional optical head device. Parallel light that has been emitted by a blue optical system 51, which has a blue light source with a wavelength $\lambda 1$ of 405 nm, passes through a beam splitter 161 and a wavelength selection phase plate 205 and is focused on an information recording surface of an optical disk 9 (third generation optical disk) having a substrate thickness of 0.1 mm by an objective lens 50. The light that is reflected by the optical disk 9 returns over the opposite path and is detected by a detector of the blue optical system 51.

Divergent light emitted by a red optical system 52, which has a red light source with a wavelength λ2 of 650 nm, is reflected by the beam splitter 161, passes through the wavelength selection phase plate 205, and is focused on the information recording surface of the optical disk 10 (second generation optical disk: DVD), which has a substrate thickness of 0.6 mm, by the objective lens 50. The light that is reflected by the optical disk 10 returns over the opposite path and is detected by a detector of the red optical system 52.

The objective lens 50 is configured so that incident parallel light is focused, passing through the 0.1 mm thick substrate, and when recording to and reproducing a DVD, it generates spherical aberration due to the difference in the substrate thickness. To correct this spherical aberration, the light beam that is emitted by the red optical system 52 is turned into divergent light, and the wavelength selection phase plate 205 is used. New spherical aberration is generated when the divergent light is incident on the objective lens 50, and thus the spherical aberration that is generated due to the difference in substrate thickness is canceled out by this new spherical aberration, and also, the wave front is corrected by the wavelength selection phase plate 205.

FIG. 13A and FIG. 13B show a plan view and a side view of the wavelength selection phase plate 205, respectively. The wavelength selection phase plate 205 is made of a phase step 205a having a height h and a height 3h, if the refractive index at the wavelength λ1 is n1 and h=λ1/(n1−1). For light of the wavelength λ1, the light path difference that is caused by the height h is the used wavelength λ1, corresponding to a phase difference of 2π, which is the same as a phase difference of 0. Thus, there is no effect on the phase distribution or the recording to and reproducing the optical disk 9. On the other hand, for light of the wavelength λ2, when n2 is the refractive index of a phase plate 206 at the wavelength λ2, then h/λ2×(n2−1) ≈0.6λ, that is, a light path difference that is not an integer multiple of the wavelength is generated. The phase difference resulting from this light path difference is utilized to perform aberration correction as discussed above.

As a third conventional example, a configuration in which a plurality of objective lenses are employed and are mechanically switched between also has been disclosed (for example, JP H11-296890A (pages 4 to 6, FIG. 1) (Patent Document 3).

As a fourth conventional example, a configuration in which a mirror provided with a reflective surface having a different radius of curvature also serves as a reflecting mirror that bends the optical axis has been disclosed (for example, JP H11-339307A (pages 4 and 5, FIG. 1) (Patent Document 4)).

As a fifth conventional example, a configuration has been disclosed in which, like in the first conventional example, a refraction-type objective lens and a hologram are combined, and chromatic aberration occurring in the same order of diffraction light of light of different wavelengths is employed to correct differences in the substrate thickness (for example, JP 2000-81566A (pages 4 to 6, FIGS. 1 and 2) (Patent Document 5)).

The lecture proceedings 27p-YD-5 of the 63rd Meeting of the Japan Society of Applied Physics and Related Societies (September 2002, Niigata University) (non-Patent Document 2) will be described as the fifth conventional example. The BD and DVD, which employ a blue light source and a red light source, respectively, are substantially identical to those of the second conventional example described using FIG. 12. These are described using FIG. 14. Parallel light emitted from a blue optical system 51 having a blue light source for light with a wavelength λ1 of 405 nm passes through two beam splitters 161 and a wavelength selection hologram 207 and is focused on the information recording surface of an optical disk 9 (third generation optical disk) having a substrate thickness of 0.1 mm by an objective lens 50. Light that is reflected by the optical disk 9 returns over an opposite path and is detected by a detector of a blue optical system 51.

Divergent light emitted by a red optical system 52, which has a red light source with a wavelength λ2 of 650 nm, is reflected by the beam splitters 161 and is focused on the information recording surface of the optical disk 10 (second generation optical disk: DVD), which has a substrate thickness of 0.6 mm, by the objective lens 50. The light that is reflected by the optical disk 10 returns over an opposite path and is detected by a detector of the red optical system 52.

The objective lens 50 is configured so that incident parallel light passes through the 0.1 mm thick substrate and is focused, and when recording to and reproducing a DVD, it generates spherical aberration due to the difference in substrate thickness. To correct this spherical aberration, the light beam that is emitted by the red optical system 52 is turned into divergent light. New spherical aberration is generated when the divergent light is incident on the objective lens 50, and thus the spherical aberration that is generated due to the difference in substrate thickness and is cancelled out by this new spherical aberration.

Moreover, in the fifth conventional example, parallel light that is emitted from an infrared optical system 53, which emits light with a wavelength λ3 of 785 nm, is converted into diffused light by the wavelength selection hologram 207, which has a concave lens effect only on the wavelength λ3, correcting the spherical aberration that is caused by the difference in substrate thickness between the optical disk 11 and the optical disk 9.

The first conventional example discussed above proposes at least the following three inventive concepts: first, the use of diffraction by a hologram to achieve compatibility with optical disks having different substrate thicknesses; second, changing the design of the inner and outer circumference so as to form focus spots with different numerical apertures; and third, the use of diffraction by the hologram to change the focal position of the focus spot for optical disks with different substrate thicknesses. These inventive concepts do not limit the wavelengths of the light beams emitted by the light sources.

Here DVDs, which are second-generation optical disks, include two-layered disks having two recording surfaces. The recording surface on the side near the objective lens (the first recording surface) must allow light to pass through to the surface that is away from the objective lens, and thus its reflectance is set to about 30%. However, this reflectance is assured only for red light, and is not assured for other wavelengths. Consequently, to reliably reproduce a DVD it is necessary to use red light (wavelength λ2=630 to 680 nm). Also, to sufficiently reduce the focus spot radius when recording to and reproducing from third generation disks it is necessary to use blue light (wavelength λ1=390 to 415 nm). The first conventional example does not specifically disclose a configuration that further increases the light usage efficiency when both red light and blue light are used in order to be compatible with different types of optical disks.

Also, although the first conventional example discloses a configuration in which the hologram is provided with a convex lens shape and positive first-order diffraction light is used to reduce movement of the focal position due to changes in the wavelength with respect to a single type of optical disk, it does not disclose a configuration in which movement of the focal position due to changes in the wavelength is reduced with respect to two or more types of optical disks.

In the second conventional example, a wavelength selection phase plate is used as a compatibility element. When recording to and reproducing from a disk with a thick substrate, the distance from the recording surface to the objective lens is increased by the substrate thickness, and thus it is necessary to extend the focal length. The focal length can be extended by providing the compatibility element with a lens power, but the wavelength selection phase plate does not have a lens power. Also, when the red light is turned into diffused light as in the second conventional example in order to achieve all of this lens power, a large aberration occurs when the objective lens is moved for tracking, for example, and this causes the problem of a decline in recording and reproducing properties.

In the third conventional example, the objective lens is switched and thus a plurality of objective lenses are required, which increases the number of components as well as makes it difficult to provide a compact optical head device. Also, the fact that a switching mechanism is required itself is problematic because it makes it difficult to provide a compact optical head device.

In the fourth conventional example, the objective lens is driven independent of the mirror (see FIGS. 4 to 6 of Patent Document 4). However, since the light beam is converted from parallel light by a mirror having a radius of curvature, as discussed above, moving the objective lens for the purpose of tracking, for example, changes the position of the objective lens relative to the wave front of the incident light, which causes aberration and worsens the light-focusing properties.

Also, the reflective surface of the mirror is constituted by a surface having a radius of curvature, that is, a spherical surface, but with a spherical surface, there is the problem that differences in substrate thickness and differences in wavelength cannot be corrected sufficiently, and high-order aberration of a fifth order or higher cannot be reduced sufficiently.

In the fifth conventional example, a wavelength selection hologram that has a concave lens effect only with respect to a 785 nm wavelength is used in order to reproduce optical disks with a 1.2 mm substrate thickness (CDs); however, the configuration of the wavelength selection hologram is not disclosed in detail. Also, as regards red light and blue light, it is conceivable to constitute a hologram using a phase step that results in a phase of an integer multiple (three or more times) of a specific wavelength, such as red light (660 nm) and blue light (405 nm), but by designing the wavelength selection hologram 207 considering only the reproduction of the optical disk 11 with infrared light, even slight fluctuations in the wavelength, such as the red light becoming 661 nm due to temperature changes, will cause aberration reaching several dozen $m\lambda$ rms. Thus there is the problem that it may not be possible to record to or reproduce from the optical disk 9 and the optical disk 10.

Accordingly, the present invention was arrived at in light of the foregoing problems, and it is an object thereof to interchangeably reproduce and record to an optical disk (CD) with a 1.2 mm substrate thickness and a corresponding wavelength $\lambda 3$ (typically approximately 790 nm), an optical disk (DVD) with a 0.6 mm substrate thickness and a corresponding wavelength $\lambda 2$ (typically approximately 650 nm), and an optical disk (blue light disk) with a 0.1 mm substrate thickness and a corresponding wavelength $\lambda 1$ (typically approximately 405 nm) with excellent light usage efficiency, and using a single objective lens.

SUMMARY OF THE INVENTION

An optical head device according to a first aspect of the present invention is provided with a blue laser light source for emitting a blue light beam, an infrared laser light source for emitting an infrared light beam, an objective lens for receiving light beams emitted from the blue laser light source and the infrared laser light source and focusing them into a spot on a recording surface of an optical disk, and an optical detector in which is formed an optical detector portion for receiving a light beam reflected by the recording surface of the optical disk and outputting an electric signal that corresponds to a light amount of the light beam. Due to the objective lens, the light beam emitted by the blue laser light source is focused into a spot on the recording surface of an optical disk after passing through a substrate of approximately 0.1 mm or less thickness. A relay lens is disposed between the infrared laser light source and the objective lens. The infrared light beam emitted from the infrared laser light source is substantially converged by the relay lens and then, as it diverges once again, it is incident on the objective lens, and the objective lens focuses the infrared light beam into a spot on the recording surface of an optical disk, after passing through an approximately 1.2 mm substrate.

It is preferable that the relay lens adds spherical aberration at its outer circumference portion away from the optical axis, and due to the spherical aberration, corrects off-axial aberration.

It is also preferable that a distance between the relay lens and a point of convergence on a side opposite a point of emission of the infrared light beam is shorter than a distance between the relay lens and the point of emission of the infrared light beam.

It is also preferable that the optical head device according to the first aspect includes a dichroic element, for separating the infrared light beam and shorter wavelength light beams, between the relay lens and the objective lens.

It is also preferable that a dichroic film for separating the infrared light beam and shorter wavelength light beams is formed on a surface of a parallel flat plate provided in the dichroic element disposed between the relay lens and the objective lens.

It is also preferable that a thickness of the parallel flat plate is 1 mm or less.

It is also preferable that the dichroic element is disposed at a position where the blue light beam is a substantially parallel light beam.

It is also preferable that the optical head device according to the first aspect includes a hologram between the objective lens and the blue laser light source. A grating cross-sectional shape in at least a part of the hologram has a sawtooth cross-sectional shape. A depth of the sawtooth cross-sectional shape is h1, and h1 is a depth that results in a light path difference of approximately two wavelengths with respect to a first light beam whose wavelength $\lambda 1$ is 390 nm to 415 nm. By giving the hologram a convex lens form so that if the first light beam is focused passing through a substrate whose thickness (t1) is 0.1 mm or less it is subjected to a convex lens effect by the hologram, a change in a focal length is reduced if the wavelength $\lambda 1$ changes by about several nm.

It is also preferable that the optical head device according to the first aspect includes a second light source for emitting a second light beam whose wavelength $\lambda 2$ is 630 nm to 680 nm. With respect to the second light beam, a positive first-order diffraction light from the hologram is the strongest. A positive second-order diffraction light of the first light beam is focused after passing through a substrate whose substrate thickness is t1, and a positive first-order diffraction light of the second light beam that passes through an inner circumferential portion of the hologram is focused after passing through a substrate whose substrate thickness is t2, where t1<t2.

It is also preferable that positive first-order diffraction light of the second light beam that passes through an outer circumferential portion of the hologram has aberration when it has passed through a substrate whose substrate thickness is t2, and is not focused.

It is also preferable that if the first light beam is focused passing through a substrate whose substrate thickness is t1, then by having the hologram exert a greater convex lens effect than if the second light beam that passes through the inner circumference portion of the hologram is focused passing through a substrate whose substrate thickness is t2, or by having the hologram exert a smaller convex lens effect when the second light beam that passes through the inner circumference portion of the hologram is focused passing through a substrate whose substrate thickness is t2 than when the first light beam is focused passing through a substrate whose substrate thickness is t1, a focal position on the optical disk side is moved away from a compound objective lens, where t1<t2.

As an optical head device according to a second aspect of the present invention, it is also preferable that when focusing the second light beam onto the recording surface of an optical disk after passing through a substrate whose substrate thickness is t2, a collimating lens for turning the second light beam that is emitted from the second light source into substantially parallel light is moved toward the second light source so that the second light beam is turned into slightly diverged light and made incident on the objective lens, moving the focal position on the optical disk side away from the composite objective lens.

It is also preferable that the optical head device according to the first aspect includes a phase step in which is formed a step difference that causes a light path length difference of five times the wavelength with respect to the blue light beam and three times the wavelength with respect to the second light beam.

It is also preferable that the hologram and the objective lens are fixed as a single unit.

It is also preferable that the hologram is formed integrally with the surface of the objective lens.

An optical information device according to a third aspect of the present invention includes an optical head device, a motor for rotating an optical disk, and an electric circuit for receiving signals obtained from the optical head device, and based on the signals, for controlling and driving the motor and the objective lens and the laser light sources of the optical head device. The optical head device is the optical head device according to the first aspect of the present invention.

It is preferable that the optical head device is the optical head device according to the second aspect, and that different types of optical disks are distinguished between and the collimating lens is moved toward the second light source in the case of optical disks whose substrate thickness is 0.6 mm.

A computer according to the present invention includes an optical information device, an input device or an input element for inputting information, a computing device for carrying out computing based on information input from the input device or information reproduced from the optical information device, and an output device or an output element for displaying or outputting information input from the input device, information reproduced from the optical information device, or the results of the computation performed by the computing device. The optical information device is the optical information device according to the third aspect of the present invention.

An optical disk player according to the present invention includes an optical information device and a decoder for converting information signals obtained from the optical information device from information to be converted into an image, into an image, wherein the optical information device is the optical information device according to the third aspect of the present invention.

A car navigation system according to the present invention includes an optical information device and a decoder for converting into an image information signals obtained from the optical information device from information to be converted into an image. The optical information device is the optical information device according to the third aspect of the present invention.

An optical disk recorder according to the present invention includes an optical information device and an encoder for converting into information image information from an image to be converted into information to be recorded by the optical information device. The optical information device is the optical information device according to the third aspect of the present invention.

An optical disk server according to the present invention includes an optical information device and an input/output element for exchanging information with the outside, where the optical information device is the optical information device according to the third aspect of the present invention.

With the present invention, it is possible to interchangeably reproduce and record to an optical disk (CD) with a 1.2 mm substrate thickness and a corresponding wavelength $\lambda 3$ (typically approximately 790 nm), an optical disk (DVD) with a 0.6 mm substrate thickness and a corresponding wavelength $\lambda 2$ (typically approximately 650 nm), and an optical disk (blue light disk) with a 0.1 mm substrate thickness and a corresponding wavelength $\lambda 1$ (typically approximately 405 nm) with excellent light usage efficiency, and using a single objective lens.

DESCRIPTION OF THE PREFERRED EMBODIMENTS

First Embodiment

Figure 1:
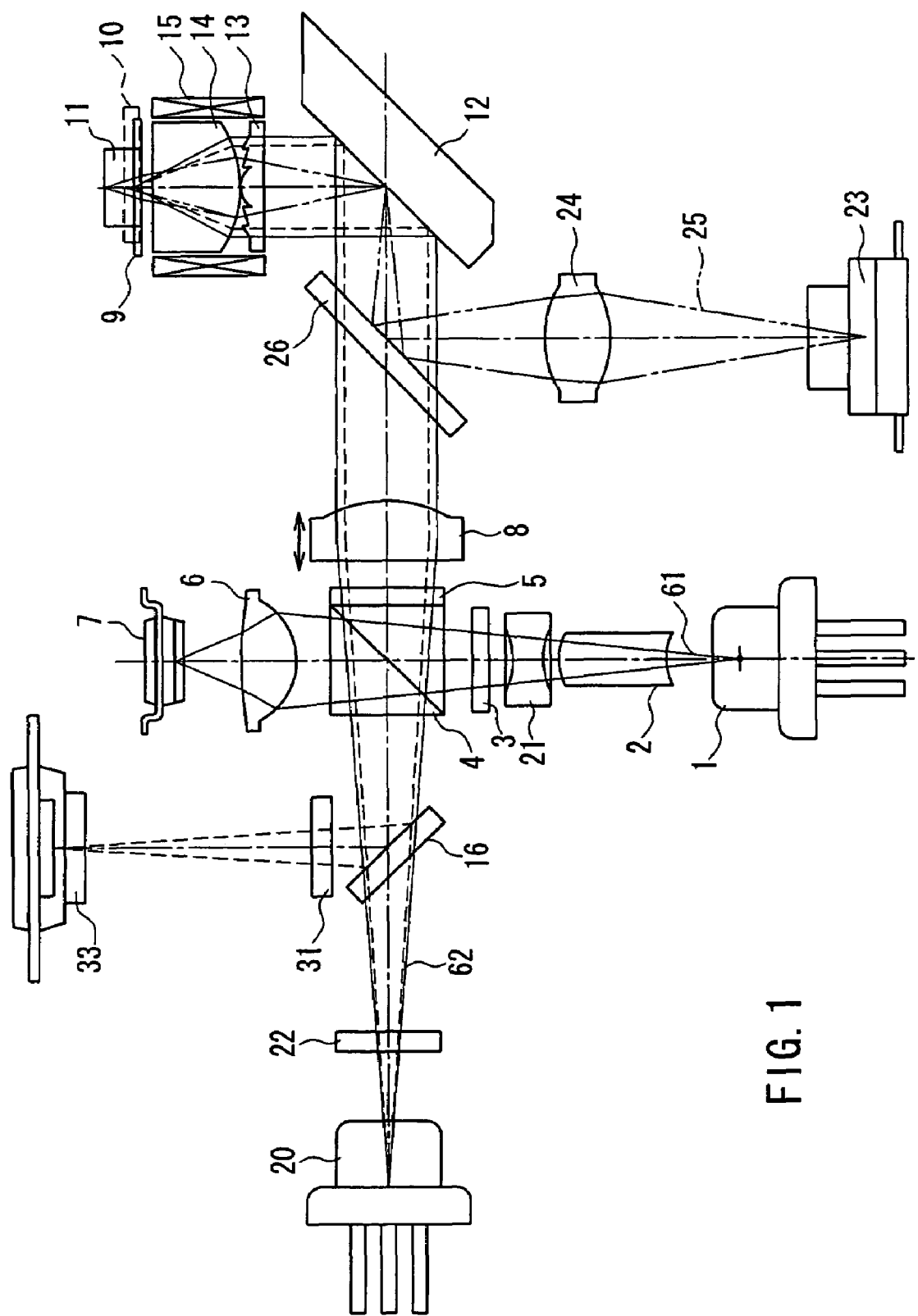
FIG. 1 is a schematic cross-sectional diagram of the optical head device according to a first embodiment of the present invention.

FIG. 1 is a diagrammatic representation showing an optical head device according to a first embodiment of the present invention. In FIG. 1, the reference numeral 1 denotes a laser light source that emits laser light with a wavelength λ1 (390 nm to 415 nm; typically about 405 nm, and thus hereinafter wavelengths of 390 nm to 415 nm are referred to collectively as 405 nm), 20 denotes a laser light source that emits laser light with a wavelength λ2 (630 nm to 680 nm; typically 660 nm is most frequently used, and thus hereinafter wavelengths of 630 nm to 680 nm are referred to collectively as 660 nm), and 23 denotes an infrared laser, hologram, and optical detector in which a semiconductor laser light source that emits laser light with a wavelength λ3 (770 nm to 810 nm; typically 790 nm is most frequently used, and thus hereinafter wavelengths of 770 nm to 810 nm are referred to collectively as 790 nm), an optical detector, and a hologram are hybridized into a single integrated unit (hereafter, referred to as infrared light unit). 14 denotes an objective lens, 24 denotes a relay lens for substantially converging infrared light emitted from the infrared unit 23, guiding it to the objective lens 14, and then once again converging it onto the information recording surface of an optical disk 11, and 8 denotes a collimating lens (first convex lens). Reference numeral 12 denotes a reflecting mirror for bending an optical axis. Reference numeral 9 denotes a third generation optical disk whose substrate thickness t1 is approximately 0.1 mm (hereinafter, substrate thicknesses from 0.06 mm to 0.11 mm are referred to as approximately 0.1 mm) or less, and which is recorded to and reproduced by a light beam with the wavelength λ1. Reference numeral 10 denotes a second generation optical disk such as a DVD whose substrate thickness t2 is approximately 0.6 mm (hereinafter, substrate thicknesses from 0.54 mm to 0.65 mm are referred to as approximately 0.6 mm) and which is recorded to and reproduced by a light beam with the wavelength λ2. Reference numeral 11 denotes a first generation optical disk such as a CD whose substrate thickness t3 is approximately 1.2 mm and which is recorded to and reproduced by a light beam with the wavelength λ3. As regards the optical disks 9, 10, and 11, only their substrate from the surface on which light is incident to their recording surface is shown. In practice, they are combined with a protective plate to provide extra mechanical strength and make their external thickness 1.2 mm. For example, the optical disk 10 is combined with a protective material that is 0.6 mm thick, whereas the optical disk 9 is combined with a protective material that is 1.1 mm thick. For the sake of simplicity, the protective material has been omitted in the drawings of the present invention.

The laser light sources 1 and 20 are preferably semiconductor laser light sources so that the optical head device and the optical information device using the optical head device can be made compact, lightweight, and low-energy.

When recording to and reproducing from the optical disk 9, which has the highest recording density, a blue light beam 61 with the wavelength λ1 that is emitted from the laser light source 1 is reflected by a beam splitter 4 and then turned into circularly polarized light by a quarter wavelength plate 5. The quarter wavelength plate 5 is designed to function as a quarter wavelength plate with respect to both the wavelength λ1 and the wavelength λ2. This circularly polarized light is turned into substantially parallel light by the collimating lens 8, its optical axis is bent by the reflecting mirror 12, and it is focused on an information recording surface 91 (see FIG. 2) by a hologram (refractive optical element) 13 and the objective lens 14 after passing through the approximately 0.1 mm thick substrate of the optical disk 9.

The blue light beam 61 that is reflected by the information recording surface 91 travels over a light path opposite its original light path (return path) and is turned into linearly polarized light in the direction perpendicular to its initial direction by the quarter polarizing plate 5. It is then substantially completely transmitted by the beam splitter 4, totally reflected by a beam splitter 16, diffracted by a detection hologram 31, and then incident on an optical detector 33. The output of the optical detector 33 is calculated in order to obtain an information signal and a servo signal used for focus control and tracking control. It should be noted that although it is not shown, it is also possible for a detection lens to be disposed in front of the optical detector 33 so as to provide favorable servo signal properties.

As described above, the beam splitter 4 is a polarized light separating film that, as regards the wavelength λ1 light beam, totally reflects light linearly polarized in one direction and totally allows light polarized in the direction perpendicular to this direction to pass. Also, as will be discussed later, as regards the wavelength λ2 light beam, it totally allows a red light beam 62 that is emitted by the red light source 20 to pass through. Thus, the beam splitter 4 is a light path branching element having both light polarizing properties and wavelength selection properties.

Next, when recording to or reproducing from the optical disk 10, the wavelength λ2 light beam 62 emitted by the red laser 20 is substantially linearly polarized and passes through the beam splitter 16 and the beam splitter 4, and becomes substantially parallel light due to the collimating lens 8. Then, its optical axis is bent by the reflecting mirror 12 and it is focused on an information recording surface 101 (see FIG. 2) by the hologram 13 and the objective lens 14, passing through the approximately 0.6 mm thick substrate of the optical disk 10.

The light beam 62 that is reflected by the information recording surface 101 travels over a light path opposite its original light path (return path), is substantially completely transmitted by the beam splitter 4, is completely reflected by a beam splitter 16, and then is diffracted by a detection hologram 31 and is incident on an optical detector 33. The output of the optical detector 33 is calculated in order to obtain information signals and servo signals used for focus control and tracking control. Thus, to obtain servo signals for the optical disks 9 and 10 from the same optical detector 33 the points from which the blue laser 1 and the red laser 20 emit light are disposed so that they form an image at the same position on the objective lens 14 side. This allows the number of detectors as well as the number of wires to be reduced.

The beam splitter 16 is a polarizing and separating film that, as regards the light beam with the wavelength $\lambda 2$, allows all light polarized in one direction to pass through and completely reflects linearly polarized light in the direction that is perpendicular to this direction. Also, as regards the light beam with the wavelength $\lambda 1$, it totally reflects the blue light beam 61. Thus, the beam splitter 16 as well is preferably a light path branching element having both light polarizing properties and wavelength selecting properties.

Here, the operation and the configuration of a hologram 134 and an objective lens 144, which are modified examples of the hologram 13 and the objective lens 14, are described using FIGS. 2, 3A, 3B, and 4A to 4C.

Figure 2:
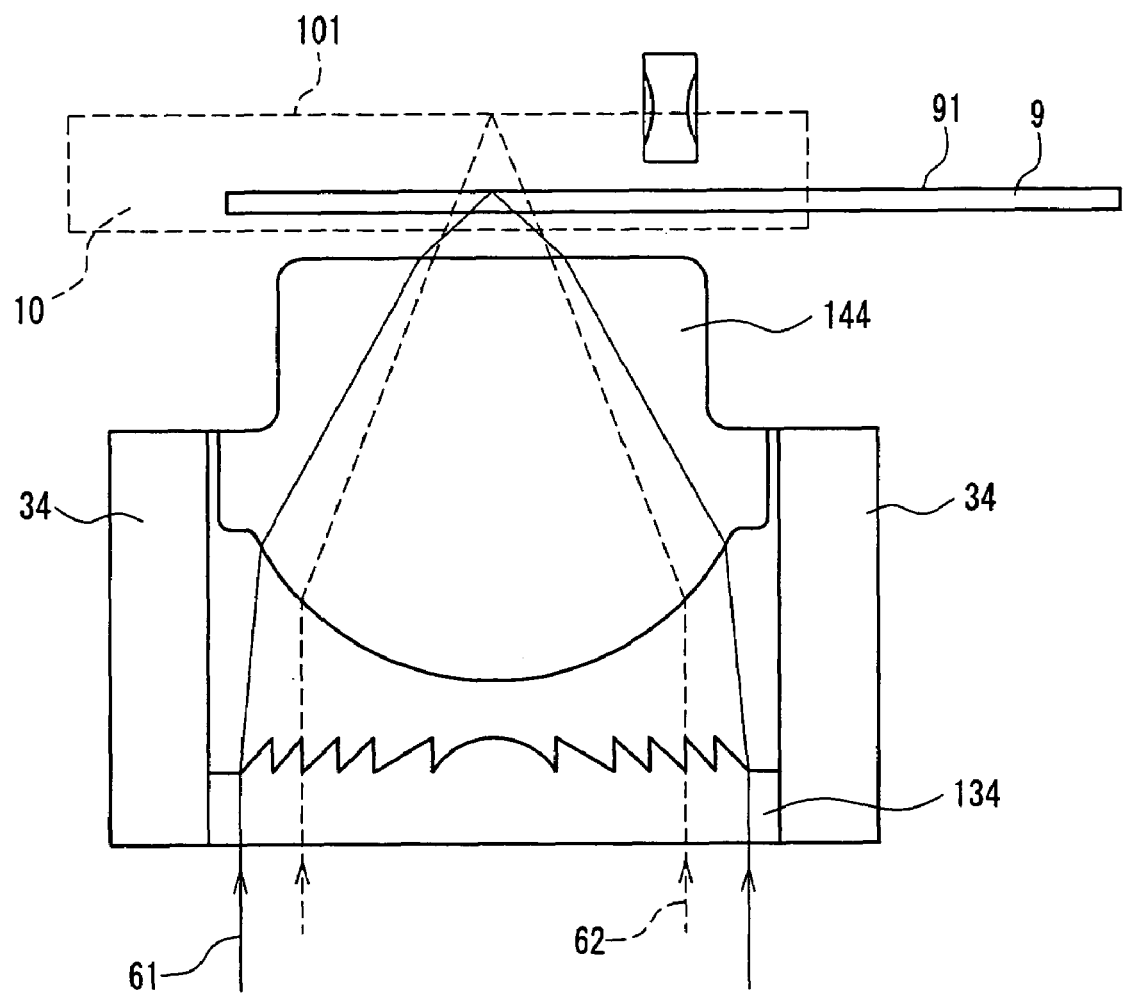
FIG. 2 is a schematic cross-sectional diagram of the primary components according to the first embodiment of the present invention.

In FIG. 2 the reference numeral 134 denotes a hologram. The hologram 134 diffracts, and has a convex lens effect on, blue light 61 having the wavelength $\lambda 1$, and as will be described later, it diffracts, and has a convex lens effect that is less than its convex lens effect with respect to the blue light beam, or light of wavelength $\lambda 2$. Here, diffraction of the lowest order at which there is a convex lens effect is defined as positive first-order diffraction. In this embodiment, the hologram 134 is designed so that for the blue light beam, the positive second-order diffraction has the strongest action. In turn, for the red light beam, the positive first-order diffraction has the strongest action. This means that the red light beam has smaller diffraction angles at various points on the hologram 134 than the blue light beam, even through the red light beam has a longer wavelength than the blue light beam. That is, the hologram 134 has a stronger convex lens effect when diffracting the blue light beam 61 with the wavelength $\lambda 1$ than it does with respect to light with the wavelength $\lambda 2$. In order words, although the red light beam is subjected to convex lens action by the hologram 134, when the action that the blue light beam is subjected to is taken as a standard, then relatively speaking, the red light beam is subjected to a concave lens effect due to diffraction.

The objective lens 144 is designed so that, after the blue light beam 61 with the wavelength $\lambda 1$ is diffracted to the second-order and subjected to a convex lens action by the hologram 134, it is further converged and passes through the t1 thick substrate of the optical disk 9 before being focused on the recording surface 91.

The action of the hologram 134 when recording to and reproducing from the optical disk 10 using the red light beam 62 is described in detail next. The hologram 134 diffracts light of the wavelength $\lambda 2$(dotted line: red light beam 62) to the positive first order, exerting a convex lens effect on the light. Then, due to the objective lens 144, the red light beam 62 then passes through the approximately 0.6 mm thick substrate of the optical disk 10 and is focused on the information recording surface 101. Here, the disk 10 is thick, having a substrate thickness of 0.6 mm from its light incidence surface to the information recording surface 101, and thus the focal position must be farther away from the objective lens 144 than the focal position when recording to and reproducing from the optical disk 9, whose substrate thickness is 0.1 mm. As shown in FIG. 2, by turning the blue light beam 61 into converged light through wave front conversion and easing the angle of convergence of the red light beam 62 compared to the angle of convergence of the blue light beam 61, correction of the focal position and correction of spherical aberration due to the difference in substrate thickness is achieved.

The hologram 134 converts the wave front of both the blue light beam 61 with the wavelength $\lambda 1$ and the red light beam 62 with the wavelength $\lambda 2$. Consequently, since wave fronts according to the design are not incident on the objective lens 144 when there is error in the relative position between the hologram 134 and the objective lens 144, aberration occurs in the wave fronts incident on the optical disk 9 and the optical 10, worsening the light-focusing properties. Accordingly, it is preferable that the hologram 134 and the objective lens 144 are fixed as a single unit that is driven by a common driver 15 (FIG. 1) when focus controls and tracking controls are performed.

It should be noted that it is preferable that the hologram 134 is formed directly on the surface of the objective lens 144, because this allows the number of components to be reduced.

Figure 3A:
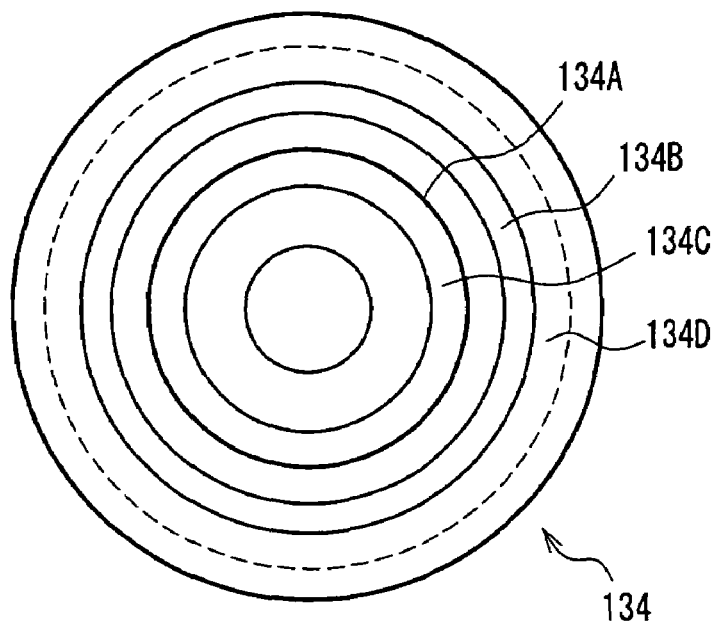
FIG. 3A is a schematic plan view of the primary components according to the first embodiment of the present invention.
Figure 3B:
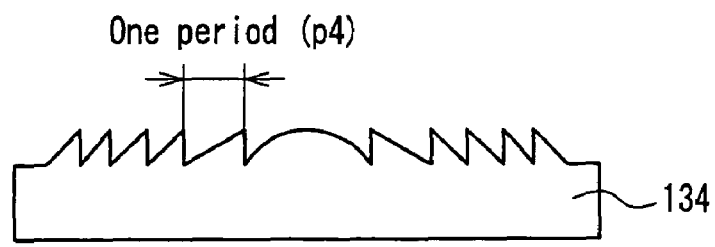
FIG. 3B is a cross-sectional view thereof.

FIG. 3A and FIG. 3B show the hologram 134. FIG. 3A is a plan view and FIG. 3B is a cross-sectional view like FIG. 2. The hologram 134 has an inner/outer circumferential boundary 134A whose inner side (inner circumferential portion 134C) and outer side (outer circumferential portion 134B between the inner/outer circumferential boundary 134A and an effective range 134D) differ from one another. The inner circumferential portion 134C is a region including the point of intersection between the hologram 134 and the optical axis, that is, the center. The region of the inner circumferential portion 134C is used both when recording to and reproducing the optical disk 10 using the red light beam 62 and when recording to and reproducing the optical disk 9 using the blue light beam 61. Consequently, the diffraction grating of the inner circumferential portion 134C and the portion of the objective lens 144 through which the red light beam 62 diffracted here passes are designed so that the positive second-order diffraction light of the blue light beam 61 is focused on the optical light beam 9 and the positive first-order diffraction light of the red light beam 62 is focused on the optical disk 10. As for the outer circumferential portion 134B, it is necessary that the numerical aperture NAb when recording to and reproducing from the optical disk 9 with the blue light beam 61 is larger than the numerical aperture NAr when recording to and reproducing from the optical disk 10 with the red light beam 62 (NAb>NAr). Thus, only the positive second-order diffraction light of the blue light beam 61 is focused on the optical disk 9 at the circumference of the inner circumferential portion 134C for focusing the red light beam 62 and the blue light beam 61 onto the corresponding optical disks 10 and 9, respectively. Also, it is necessary that the outer circumferential portion 134B and the outer circumferential portion of the objective lens 144 corresponding to this are provided so that the positive first-order diffraction light of the red light beam 62 has aberration with respect to the optical disk 10. That is, although not shown in the drawings, it is preferable that the objective lens 144, like the hologram 134, is designed so that its inner and outer circumferences are different. This allows an optimal NA, that is, NAb>NAr, to be achieved.

Figure 4A:
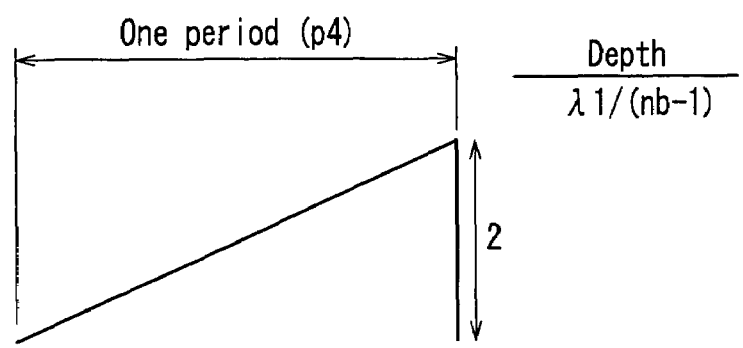
FIG. 4A is a schematic cross-sectional view of the primary components according to the first embodiment of the present invention.
Figure 4B:
FIGS. 4B and 4C are diagrams for explaining the phase change according to the first embodiment.
Figure 4C:
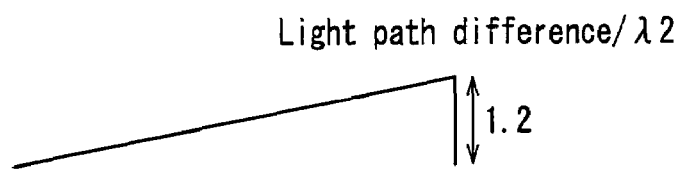

FIGS. 4A to 4C are diagrams for describing the cross-section of one period (p4) of the hologram grating of the hologram 134. FIG. 4A shows the physical shape. A shape such as this that looks like the tooth of a saw is referred to as sawtooth shaped. The direction of the oblique surface is expressed by representing the shape of FIG. 4A as a shape whose substrate has an oblique surface on the left side. In line with this definition, the cross-sectional shape of the hologram 134 of FIG. 3B may be expressed as a sawtooth shape whose substrate has an oblique surface at its outer circumferential side. FIG. 4B shows the amount of phase modulation with respect to the blue light. FIG. 4C shows the amount of phase modulation with respect to the red light.

In FIG. 4A, the vertical direction shows the depth of the sawtooth shaped grating. Here, nb is the refractive index of the material of the hologram 134 with respect to the blue light beam 61. When the material of the hologram 134 is for example BK7, which is a type of glass material, then nb=1.5302.

The depth of the sawtooth shaped grating is an amount that results in a light path length difference with respect to the blue light beam 61 of approximately 2 wavelengths, that is, the phase difference is approximately $4\pi$. The depth h1 is:

$$h1=\lambda 1/(nb-1)\times 2=1.53 \, \mu m$$

The amount of phase modulation with respect to the blue light beam 61 due to this shape is a $4\pi$ ($=2\pi\times 2$) change within the grating period, and thus the intensity of the positive second-order diffraction light is maximal and according to scalar calculation, there is 100% diffraction efficiency.

On the other hand, when nr is the refractive index of the material of the hologram 134 with respect to the red light beam 62, then nr=1.5142 if BK7 is the material of the hologram 134, and thus the light path length difference generated with respect to the red light beam 62 due to the step h1 is $h1\times(nr-1)/\lambda 1=1.19$, that is, approximately 1.2 times the wavelength, and the phase modulation amount is approximately $2.4\pi$. Consequently, the positive first-order diffraction light intensity is strongest, and the calculated diffraction efficiency is approximately 80%.

Thus, when the shape of the grating period is a shape having a sawtoothed cross-section with the depth h1 as shown in FIG. 4A, then, as for the blue light beam 61, the positive second-order diffraction is strongest, as explained above, and thus the grating period for determining the diffraction angle is substantially p4/2 and the phase change is equivalent to that in FIG. 4B. As regards the red light beam 62, the positive first-order diffraction is strongest, and thus the grating period for determining the diffraction angle is substantially p4.

The optical configuration for recording to and reproducing an optical disk (CD) having a substrate thickness of 1.2 mm and a corresponding wavelength $\lambda 3$ (typically approximately 790 nm) is described next using FIG. 1. An infrared light beam 25 that is emitted from an infrared light unit 23 is first substantially converged by a convex-type relay lens 24. Then, the infrared light beam 25 widens again, and is again converged, this time onto the information recording surface of the optical disk 11, by the hologram 13 and the objective lens 14.

The substrate thickness of the optical disk 11 is approximately 1.2 mm, which is 1.1 mm thicker than the 0.1 mm thick substrate of the optical disk 9, and thus it is necessary to move the focal point at which light is converged further away from the objective lens 14 by a corresponding amount. As described above, after the infrared light beam 25 is substantially converged by the relay lens 24 a first time, the light diverging again is made incident on the objective lens 14, allowing the focal point at which it is converged onto the recording surface of the optical disk 11 to be moved farther away from the lens.

It should be noted that a dichroic mirror 26 is provided in order to synthesize and branch the light paths of the red light beam 62 and the blue light beam 61 and the light path of the infrared light beam 25. A mirror that allows the red light beam 62 and the blue light beam 61 to pass but reflects the infrared light beam 25 is used for the dichroic mirror 26. The dichroic mirror 26 is achieved by forming a dielectric thin film on glass, for example. The position where the dichroic mirror 26 is inserted is preferably a position where the blue light beam 61 and the red light beam 62 are substantially parallel. The dichroic mirror 26 is given the shape of a parallel flat plate so that aberration can be kept from occurring with respect to the blue light beam 61 and the red light beam 62. However, as will be discussed later, when the collimating lens 8 is moved in the direction of the optical axis, the blue light beam 61 and the red light beam 62 become non-parallel. Astigmatism occurs at this time due to the dichroic mirror 26, but by reducing the thickness of the dichroic mirror 26 to 1 mm or less, and preferably to 0.5 mm or less, it is possible to reduce this astigmatism to a level where it can be ignored (5 m$\lambda$rms or less).

The reflecting mirror 12 is for bending the light path in the direction vertical to the paper plane, and to facilitate understanding of the description, in FIG. 1 it is depicted in such a manner that it bends the light path upward in FIG. 1. In practice, it is positioned so that it produces a 90-degree change in direction, and it goes without saying that the objective lens 14 for bending the light path in the vertical direction of the paper plane is also disposed so that the light path is in the vertical direction of the paper plane.

Figure 5A:
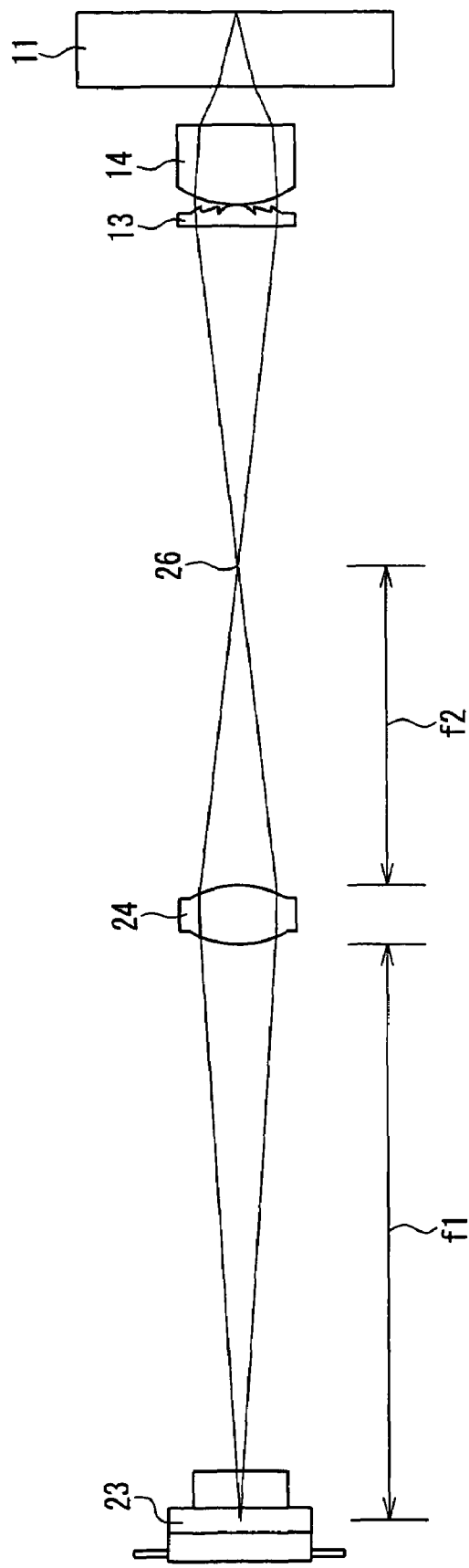
FIG. 5A is a schematic cross-sectional diagram for describing the primary components according to the first embodiment of the present invention.

The mirror has been omitted in FIG. 5 in order to facilitate the understanding of the action of the lenses. The area of the objective lens 14 and the relay lens 25 through which the light beam passes are rotation symmetric. The axis of symmetry is defined as the optical axes of the lenses. In FIG. 5, with the state when the optical axis of the relay lens 24 and the optical axis of the objective lens 14 are matching serving as a standard state, the relay lens 24 is formed. At this time, the region of the relay lens 24 where the NA of the focus spot that the infrared light beam forms on the optical disk 11 is 0.45 to 0.55 is referred to as the minimum effective radius. The outside of the minimum effective radium is referred to as the outer circumferential portion. The outer circumferential portion of the relay lens 24 is formed so that spherical aberration occurs at a point of convergence 26.

To record to and reproduce from an optical disk (CD) having a substrate thickness of 1.2 mm and a corresponding wavelength $\lambda 3$ (typically approximately 790 nm), the infrared light beam 25, as discussed above, is first converged and then is once again turned into divergent light and made incident on the objective lens 14. Thus, when the objective lens 14 is moved for tracking, for example, this light becomes non-axial light, and causes aberration (off-axial aberration). When shifting the lens, the light that passes thorough the outer circumferential portion of the relay lens 24 is incident on the objective lens 14, and thus the off-axial aberration is cancelled out due to the spherical aberration that is added to the outer circumferential portion of the relay lens 24, achieving the effect that good light-focusing properties can be maintained.

It should be noted that the three-beam method and Differential Push Pull (DPP) often are used to detect tracking error signals when recording to and reproducing from CDs. To detect the servo signals, a diffraction grating for three-beam generation can be formed in the hologram of the infrared light unit 23, for example, so that generated diffraction light that is reflected by the recording surface of the optical disk 11 and returns is received by the optical detector in the infrared light unit 23. Here, when diffraction light is generated from the diffraction grating for three-beam generation its optical axis is bent, and thus off-axial aberration is generated at the objective lens 14. Accordingly, a distance f2 between the relay lens 24 and the point of convergence 26 on the side opposite the point of emission of the infrared light beam is made shorter than a distance f1 between the relay lens 24 and the point of emission of the infrared light beam. Therefore, the difference between the point of convergence 26 of the light that is not diffracted and the position where the diffracted light converges can be reduced, and the angle at which the diffraction light is incident on the objective lens 14 can be made small. Therefore, it is possible to achieve the effect that off-axial aberration of the diffracted light can be reduced.

The concept of utilizing the hologram shown in this embodiment, which has a sawtooth shaped cross section with a depth that with respect to the blue light beam 61 generates a light path length difference twice its wavelength and causes positive second-order diffraction, to achieve compatibility with different disk types using the positive first-order diffraction light of the red light beam 62 is not disclosed in any of the conventional examples presented above. Another effect of a hologram that has a sawtooth shaped cross section with a depth that with respect to the blue light beam 61 generates a light path length difference twice its wavelength and causes positive second-order diffraction, is that it produces a light path length difference of one wavelength with respect to the infrared light beam 25, resulting in efficient diffraction of positive first-order diffraction light and achieving a low loss of light.

It should be noted that a configuration in which CDs are recorded to and reproduced by the infrared light beam 25 using the relay lens 24 and high-density optical disks with a substrate thickness of 0.1 mm are recorded to and reproduced by the blue light beam 61, also can be used by itself. If DVDs are not to be reproduced or recorded to by the red light beam 62, then the hologram 13 can be omitted or its design optimized for chromatic aberration correction. A hologram 13 for chromatic aberration correction can be designed to diffract second-order diffraction light of the blue light beam 61, so that the light amount of the infrared light beam 25 is concentrated to first-order diffraction light, allowing the light usage efficiency to be increased.

In this embodiment, the above novel configuration conferred to the hologram 134 the ability to act as a convex lens with respect to both the blue light beam and the red light beam. As for the diffractive action of the hologram 134, the direction of color dispersion is the direction opposite the direction of the refractive action, and thus when the hologram 134 is combined with the objective lens 144, which is a refractive convex lens, chromatic aberration with respect to wavelength changes under several nm, that is, the dependency on the wavelength of the focal length, can be cancelled out and reduced.

Consequently, there is the excellent effect that with a single hologram 134 it is possible to achieve compatibility between different types of disks, correction of chromatic aberration, and correction of the focal position.

Moreover, there is the excellent effect that CDs can be recorded to and reproduced by the infrared light beam 25 without negatively affecting the recording and reproduction of optical disks by the red light beam 62 and by the blue light beam 61, such as worsening the aberration.

Further, an example of additionally effective configurations are shown below as overall configurations of the optical head device. The following description applies for all embodiments of the present application. However, the primary aspects of the present embodiment lie in the use of the relay lens 24 for achieving the ability to reproduce from and record to the optical disk 9 and the optical disk 11 alike, the use of the hologram 13 (134 in the present working example) for achieving the ability to reproduce and record to the optical disk 9 and the optical disk 10 alike, and the use of the objective lens 14 (144) in combination with the hologram, and as for configurations other than these described, including the following description is included, and even in the configuration already discussed, the beam splitter and the detection hologram are not essential components, and it is also possible to suitably employ a configuration other than this, although a preferable configuration includes the effects of these.

In FIG. 1, it is possible to further dispose a three-beam grating (diffraction element) 3 between the blue laser 1 and the beam splitter 4 so as to detect tracking error signals of the optical disk 9 using the well-known method Differential Push Pull (DPP).

Figure 5B:
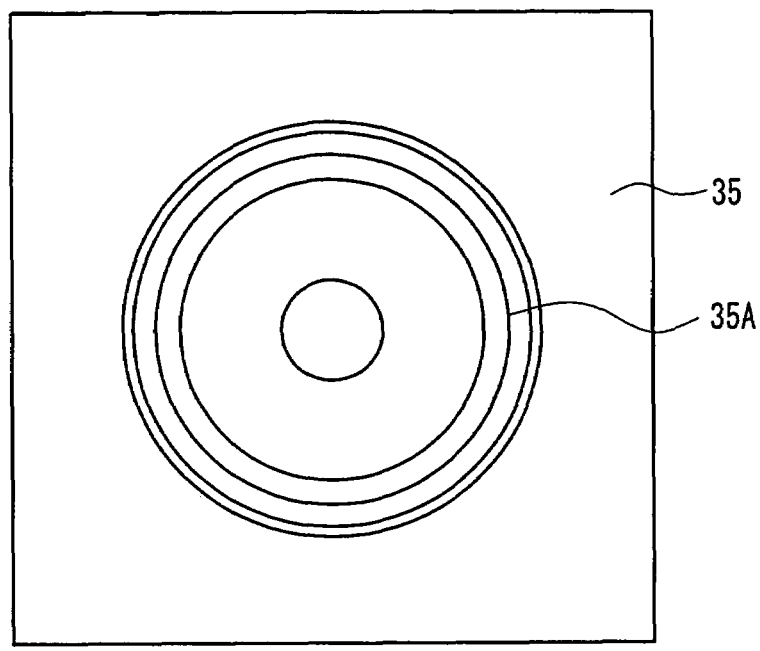
FIG. 5B is a plan view showing the configuration of the phase step according to the first embodiment.
Figure 5C:
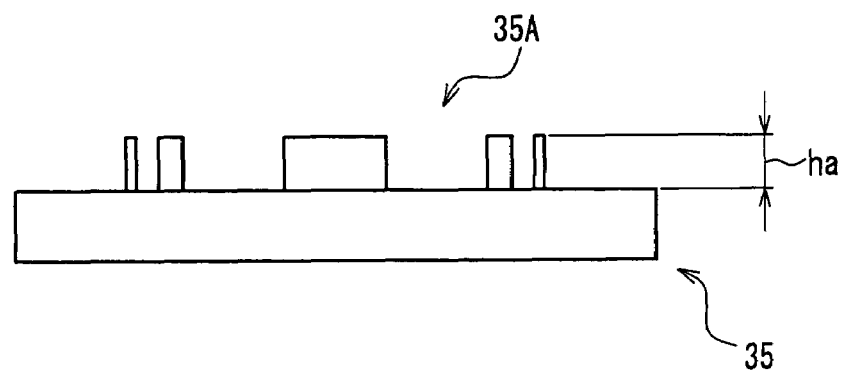
FIG. 5C is a cross-sectional view thereof.

FIG. 5B and FIG. 5C are a plan view and a cross-sectional view, respectively, describing the configuration of a phase plate 35 provided in the optical head device according to the first embodiment. The phase plate 35 also can be provided between the hologram 13 and the reflecting mirror 12 shown in FIG. 1.

A phase step 35A having a step difference ha is formed on the phase plate 35, which is plate-shaped. When nb is the refractive index of the substrate making up the phase step 35A with respect to the wavelength $\lambda 1$ (for example, 405 nm), then the step difference ha is expressed by the Expression 1 below.

$$ha = 5 \times \lambda 1/(nb-1) \qquad \text{Expression 1}$$

As shown in Expression 1, the step difference ha of one step generates a difference in light path length of five times the wavelength $\lambda 1$ with respect to light of the wavelength $\lambda 1$. In other words, the step difference ha is set so that a phase difference of $10\pi$ radian is generated.

For example, if the substrate constituting the phase step 35A is a type of glass known as BK7, then when the wavelength $\lambda 1$ is 405 nm, the refractive index nb is 1.5302, and consequently, from Expression 1, $$ha = 3819 \text{ nm} \qquad \text{Expression 2}$$

When a red light beam having a wavelength $\lambda 2$ of 655 nm, for example, is incident on the phase plate 35 on which the phase step 35A with the step difference ha is formed, then the refractive index nr of BK7 with respect to the wavelength $\lambda 2$ of 655 nm is 1.5144, and thus a light path length difference L, where $$L = ha \times (nr-1) \approx 3 \times \lambda 2 \qquad \text{Expression 3}$$

is caused.

That is, the step difference that causes a light path length difference of five times the wavelength with respect to the blue light beam causes a light path length difference of three times the wavelength with respect to the red light beam. The phase change amount caused by such a light path length difference of an integer multiple of the wavelength is an integer multiple of $2\pi$ radian ($10\pi$ radian with respect to $\lambda 1 = 405$ nm, $6\pi$ radian with respect to $\lambda 2 = 655$ nm), and thus there is substantially no phase difference. Consequently, a change in wave front is not caused with respect to the standard wavelengths of $\lambda 1$ and $\lambda 2$.

However, when light of the infrared wavelength $\lambda 3$ (770 nm<$\lambda 3$<830 nm) is incident on the phase step 35A, the step difference ha causes a light path difference of approximately 2.5 times the wavelength of the infrared light beam. Consequently, a light path difference of the portion after the decimal point of this 2.5 multiple, that is, approximately 0.5 times the wavelength, can cause a phase difference of approximately $\pi$. This phase difference is employed to convert the wave front of the infrared light beam so that spherical aberration due to the substrate thickness can be corrected and so that the ability to extend the focal length can be added. Thus, it is possible to extend the distance between the objective lens and the optical disk. Moreover, it is possible to design the relay lens so that the diffusion angle is made small, thereby allowing the relay lens to be fabricated easily.

Also, when the two directions vertical to the optical axis are defined as the x direction and the y direction, then, by further disposing a beam shaping element 2 for magnifying only the x direction between the blue laser 1 and the beam splitter 4, it is possible to bring the far-field pattern of the blue light beam 61 closer to an intensity distribution that is point symmetric with respect to the optical axis. This allows an increase in the usage efficiency of the light. The beam shaping element 2 can be constituted by a dual-surface cylindrical lens.

It is also possible further to dispose the three-beam grating (diffraction element) 22 between the red laser 20 and the beam splitter 16 so as to detect tracking error signals of the optical disk 10 using the well-known method Differential Push Pull (DPP).

It is also useful to change the parallelism of the light beam by moving the collimating lens 8 in the direction of the optical axis (in the left to right direction of FIG. 1). Spherical aberration occurs when there is error in the thickness of the substrate or, if the optical disk 9 is a two-layer disk, the substrate thickness is the result of the interlayer thickness, but by moving the collimating lens 8 in the direction of the optical axis in this manner it is possible to correct this spherical aberration.

Correction of spherical aberration by moving the collimating lens 8 in this manner is possible for about several 100 mλ if the NA of the focused light on the optical disk is 0.85, and it is also possible to correct substrate thicknesses of ±30 μm. However, because it is necessary to compensate for the substrate thickness difference of 0.5 mm or more when using the objective lens 14, which is for a 0.1 mm substrate thickness, to record to and reproduce from DVDs, simply moving the collimating lens 8 is not sufficient to correct the spherical aberration. Thus, it is necessary to convert the wave front using the hologram 13 (an example of which is the hologram 134). However, if recording to and reproducing from the optical disk 10 using the red light beam 62, then the collimating lens 8 can be moved to the left in FIG. 1, that is, the side closer to the red laser 20, so as to turn the red light beam 62 traveling toward to the objective lens 14 into divergent light and move the focus spot on the optical disk 10 farther away from the objective lens 14, and to correct some of the aberration due to the substrate thickness and widen the hologram pitch by reducing the amount of aberration correction required by the hologram 13, allowing the hologram 13 to be fabricated more easily.

Further, by allowing the beam splitter 4 to pass some (for example, about 10%) of the linearly polarized light that is emitted from the blue laser 1 and using a focusing lens 6 to guide the light beam that has been transmitted to an optical detector 7, the signal obtained from the optical detector 7 can be used to monitor changes in the amount of light emitted by the blue laser 1, and moreover, by performing feedback of this change in light amount, a control to keep the amount of light emitted by the blue laser 1 constant can be performed.

Also, by allowing the beam splitter 4 to reflect some (for example, about 10%) of the linearly polarized light that is emitted by the red laser 20 and using the focusing lens 6 to guide the reflected light beam to the optical detector 7, the signal obtained from the optical detector 7 can be used to monitor changes in the amount of light emitted by the red laser 20. Moreover, by performing feedback of that change in light amount, the amount of light emitted by the red laser 20 can be controlled to be kept constant.

It can be understood from the foregoing description that in the first embodiment the infrared light is substantially converged by the relay lens, and then, the light that once again diverges is made incident on the objective lens, thus allowing the focal point that should be converged onto the recording surface of an optical disk with a substrate thickness of 1.2 mm to be made farther away from the lens. It also allows spherical aberration caused by a difference in substrate thickness to be corrected. Furthermore, it is preferable that the position where the dichroic mirror for synthesizing and branching the light paths of the blue light and red light and the light path of the infrared light is inserted at a position where the blue light and the red light are substantially parallel light beams. Also, by making the dichroic mirror a parallel flat plate, aberration can be kept from occurring with respect to the blue light and the red light. However, the blue light and the red light become non-parallel when the collimating lens is moved in the direction of the optical axis. The dichroic mirror causes astigmatism at this time, but by making the thickness of the dichroic mirror 1 mm or less, and preferably 0.5 mm or less, the astigmatism can be reduced to a level at which it may be ignored.

The hologram diffracts the blue light beam having the wavelength $\lambda 1$, functioning as a convex lens, and it diffracts light having a wavelength $\lambda 2$, functioning as a convex lens, although with less of a convex lens effect than with respect to the blue light beam with the wavelength $\lambda 1$. When diffraction of the lowest order at which a convex lens effect is achieved is defined as positive first-order diffraction, then positive second-order diffraction occurs strongest for the blue light beam and positive first-order diffraction occurs strongest for the red light beam.

The diffraction angle is small even though the wavelength of the red light beam is longer than that of the blue light beam, and the convex lens effect when diffracting a blue light beam is stronger than the convex lens effect obtained with respect to light with the wavelength $\lambda 2$. In other words, although the red light beam is subjected to a convex lens effect by the hologram, when the effect that the blue light beam is subjected to is taken as a standard, then relatively speaking, the red light beam is subjected to a concave lens effect due to diffraction. Due to this wavefront conversion, the blue light beam is turned into converged light, and by reducing the degree of convergence of the red light beam 62 compared to the degree of convergence of the blue light beam, there is the effect that it is possible to correct the focal position and to correct spherical aberration due to differences in substrate thickness.

The hologram is a sawtooth shaped grating, and the depth of this sawtooth grating is an amount that results in a two-fold light path length difference with respect to the blue light beam, that is, a phase difference of approximately $4\pi$. The amount of phase modulation with respect to blue light due to the shape changes by $4\pi (=2\pi \times 2)$ in one period of the grating, and thus the positive second-order diffraction light intensity is strongest, and the scalar calculated diffraction efficiency is 100%. On the other hand, the light path length difference generated with regard to the red light beam is approximately 1.2 times the wavelength, the positive first-order diffraction light intensity is strongest, and the calculated diffraction efficiency is approximately 80%.

In this configuration, which employs the positive second-order diffraction light of the blue light beam and the positive first-order diffraction light of the red light beam to achieve compatibility with difference types of disks, the hologram functions as a convex lens with respect to both the blue light beam and the red light beam, and as for its diffractive action, chromatic dispersion is in the direction opposite the direction of refractive action. Thus, there is the effect that when the hologram is combined with the objective lens, which is a refractive type convex lens, chromatic aberration with respect to wavelength changes under several nm, that is, the dependency of the focal length on the wavelength, can be cancelled out and reduced.

Consequently, there is the excellent effect that with a single hologram it is possible to achieve, at one time, compatibility with different types of disks, correction of chromatic aberration, and correction of the focal position.

There is also the effect that although it is difficult to fabricate lenses with a high NA, giving the hologram the ability to function as a convex lens allows the refractive objective lens with which it is combined to be fabricated more easily.

In the present application, in addition to the foregoing effects, the following additional preferable configurations are also disclosed.

It is preferable that the hologram and the objective lens are fixed as a single unit by a supporting member, or that the hologram is formed directly onto the surface of the objective lens, so that when performing focus control or tracking control they are driven as a single unit by a common driving means, making it possible to prevent an increase in aberration due to shifting of the relative positions between the hologram and the objective lens.

It is also possible to dispose a three-beam grating (diffraction element) between the blue laser and the beam splitter so as to detect tracking error signals of the optical disk using the well-known method Differential Push Pull (DPP).

It is also possible further to dispose a three-beam grating (diffraction element) between the red laser and the beam splitter so as to detect tracking error signals of an optical disk such as a DVD using the well-known method Differential Push Pull (DPP).

It is also useful to change the parallelism of the light beam by moving the collimating lens in the direction of the optical axis. Spherical aberration occurs when there is a substrate thickness error or, if the optical disk is a two-layered disk, the substrate thickness resulting from the interlayer thickness, but by moving the collimating lens in the direction of the optical axis in this manner it is possible to correct this spherical aberration.

It is also possible to turn the red light beam traveling toward to the objective lens into divergent light and move the focus spot on the optical disk, such as a DVD, farther away from the objective lens, and to correct some of the aberration caused by the substrate thickness and widen the hologram pitch by reducing the amount of aberration correction required by the hologram, so as to allow the hologram to be fabricated more easily.

Further, the beam splitter can be configured so that it passes some (for example, about 10%) of the linearly polarized light that is emitted by the blue laser, and when the light beam that is transmitted is further guided to an optical detector 7 by a focusing lens, the signal obtained from the optical detector 7 can be used to monitor changes in the amount of light emitted by the blue laser. Moreover, by performing feedback of this light amount change, the amount of light emitted by the blue laser constant can be controlled to be kept constant.

Second Embodiment

Figure 6:
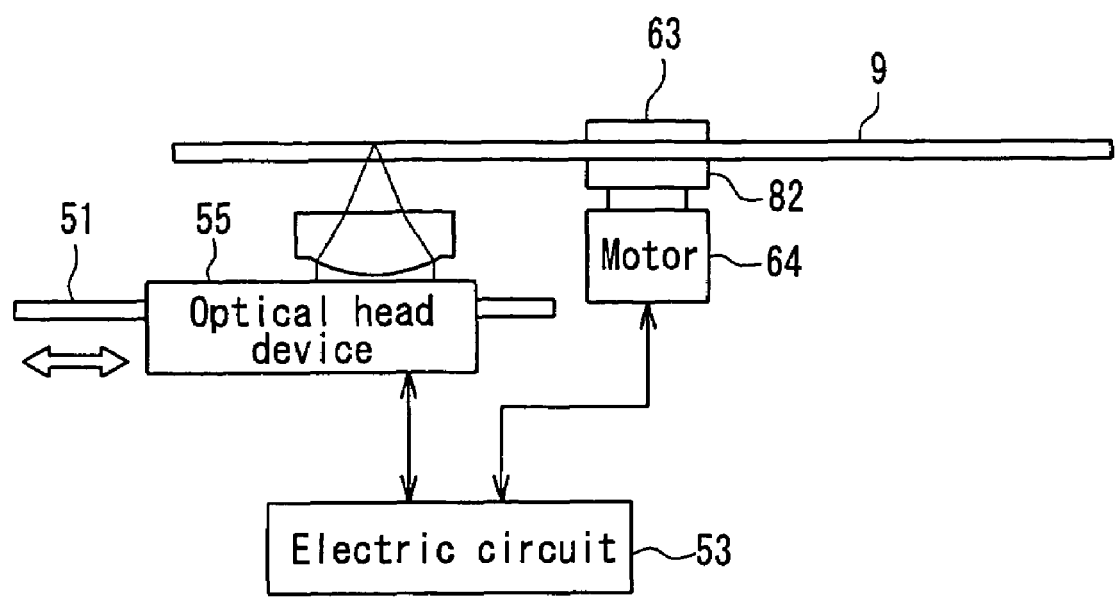
FIG. 6 is a block diagram showing the configuration of an optical information device according to a second embodiment of the present invention.

A working example of an optical information device 67 using the optical head device of the present invention is shown in FIG. 6. In FIG. 6, the optical disk 9 (or 10 or 11; same hereinafter) is placed on a turntable 82 and is rotated by a motor 64. An optical head device 55, which was shown above in the first embodiment, coarsely moves over the tracks of the optical disk 9 due to a driving device 51 of the optical head device until reaching a track having desired information.

The optical head device 55 sends focus error signals and tracking error signals to an electric circuit 53 in correspondence with its positional relationship with the optical disk 9. The electric circuit 53, in correspondence with these signals, sends a signal to the optical head device 55 to finely drive the objective lens. Due to this signal, the optical head device 55 performs focus control and tracking control with respect to the optical disk 9 and reads, writes (records), or erases information.

In the optical information device 67 according to the second embodiment, the optical head device discussed above in the first embodiment is used as the optical head device 55, and thus there is the excellent effect that with a single head device, compatibility with a plurality of types of optical disks with different recording densities can be achieved.

Third Embodiment

A computer 100 according to the third embodiment, which is provided with the above-described optical information device 67 according to the second embodiment, is shown.

A computer, optical disk player, or optical disk recorder provided with the above-described optical information device 67 according to the second embodiment, or that employs the foregoing recording and reproducing method, is capable of stably recording to and reproducing from different types of optical disks, and thus has the effect that it can be employed for a wide array of applications.

Figure 7:
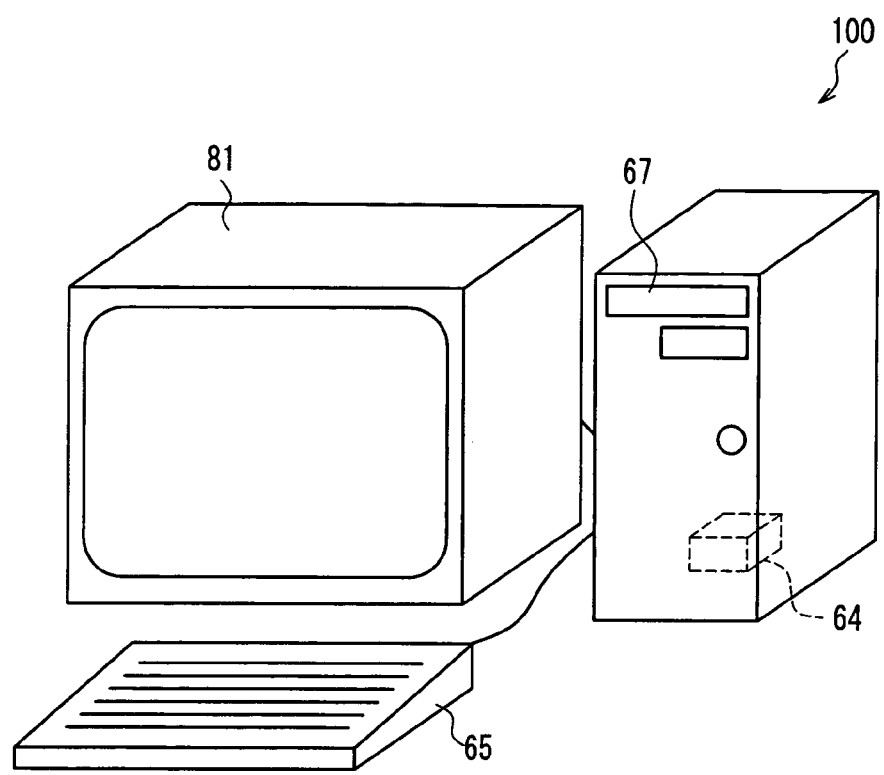
FIG. 7 is a perspective view that schematically shows the configuration of a computer according to a third embodiment of the present invention.

In FIG. 7, the computer 100 is constituted by the foregoing optical information device 67 according the second embodiment, an input device 65 such as a keyboard, mouse, or touchpad through which information is input, a computing device 64 such as a central processing unit (CPU) for performing computations based on information input through the input device 65 and information read from the optical information device 67, for example, and an output device 81 such as a cathode ray tube, a liquid crystal display device, and a printer for displaying information such as the results obtained by the computation of the computing device 64.

Fourth Embodiment

Figure 8:
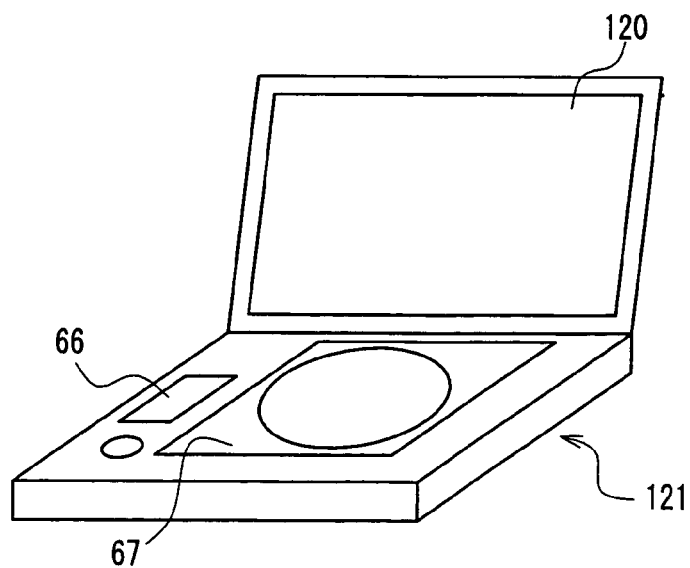
FIG. 8 is a perspective view that schematically shows the configuration of an optical disk player and a car navigation system according to a fourth embodiment of the present invention.

An embodiment of an optical disk player 121 provided with the optical information device 67 described above in the second embodiment is shown using FIG. 8.

In FIG. 8, the optical disk player 121 includes the optical information device 67 described in the second embodiment, and a conversion device (for example, a decoder 66) for converting into an image information signals obtained from the optical information device 67 from information to be converted to an image. This configuration may also be adopted for a car navigation system. It is also possible to achieve a configuration that includes a display device 120 such as a liquid crystal monitor.

Fifth Embodiment

An embodiment of an optical disk recorder 110 provided with the optical information device 67 described in the second embodiment is shown below.

Figure 9:
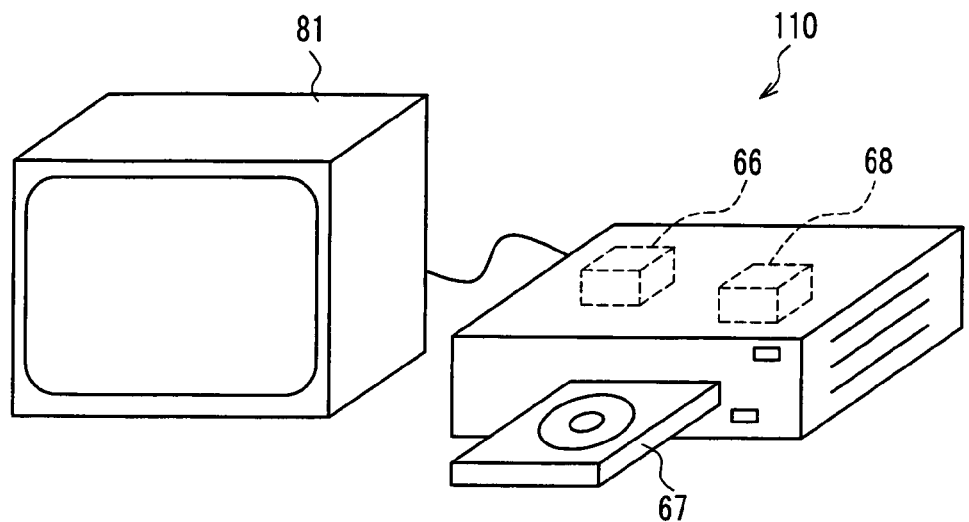
FIG. 9 is a perspective view that schematically shows the configuration of an optical disk recorder according to a fifth embodiment of the present invention.

The fifth embodiment is described using FIG. 9. In FIG. 9, the optical disk recorder 110 includes the optical information device 67 described in the second embodiment, and a conversion device (for example, an encoder 68) for converting into information image information from an image to be converted into information to be recorded to an optical disk by the optical information device. The optical disk recorder 110 preferably also includes a conversion device (for example, a decoder 66) for converting into an image information signals obtained from the optical information device 67 from information to be converted into an image, so that it may reproduce sections that have already been recorded. It is also possible for the optical disk recorder 110 to be provided with an output device 81 such as a cathode ray tube, a liquid crystal display device, or a printer.

Sixth Embodiment

Figure 10:
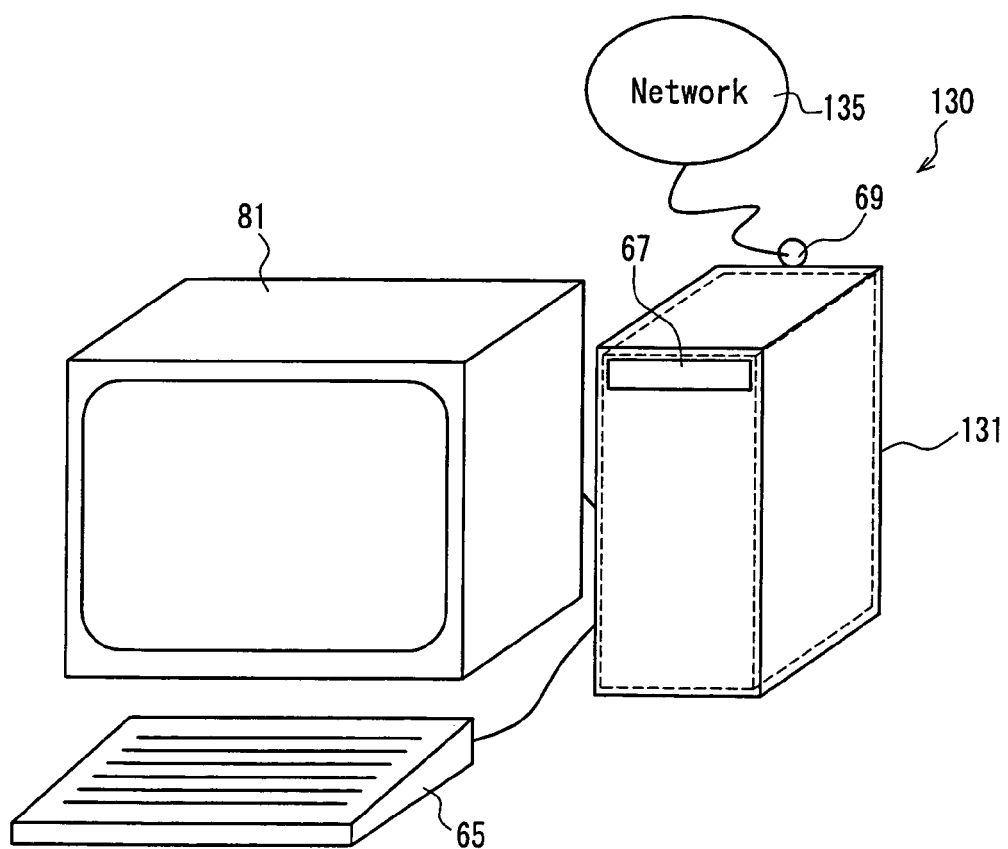
FIG. 10 is a perspective view that schematically shows the configuration of an optical disk server according to a sixth embodiment of the present invention.
Figure 11A:
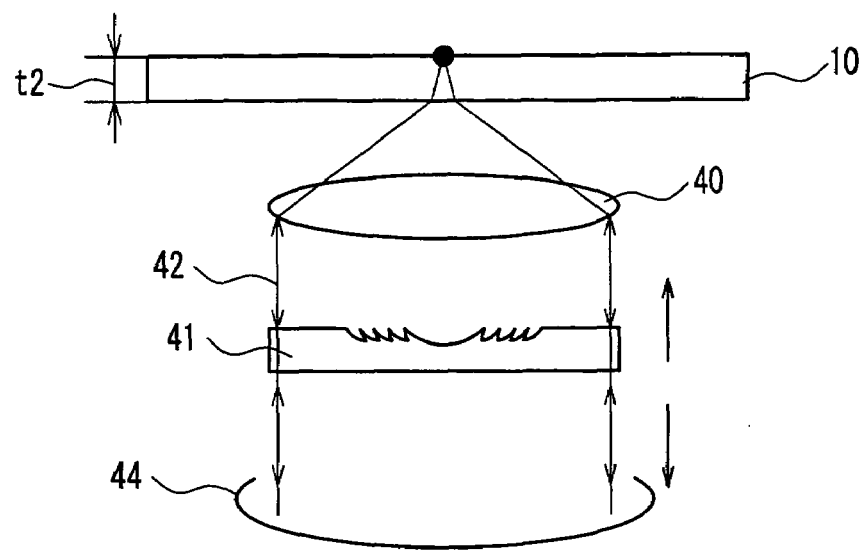
FIGS. 11A and 11B are cross-sectional diagrams schematically showing the configuration of the primary components of a conventional optical head.
Figure 11B:
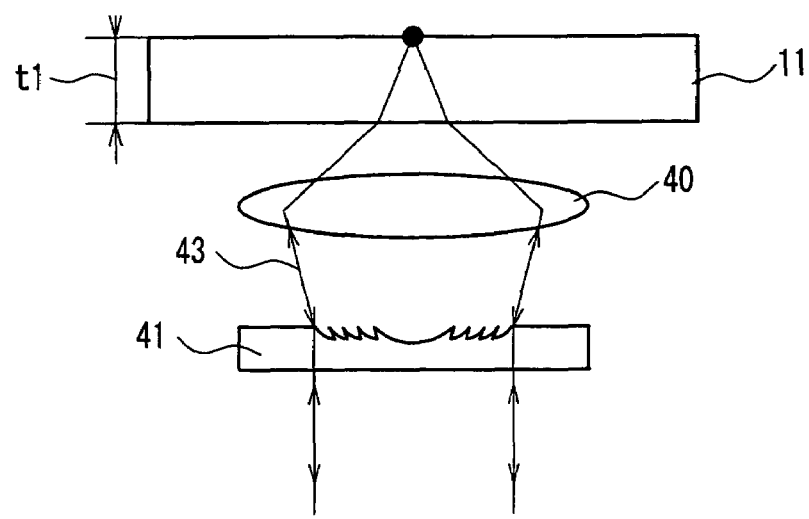
Figure 12:
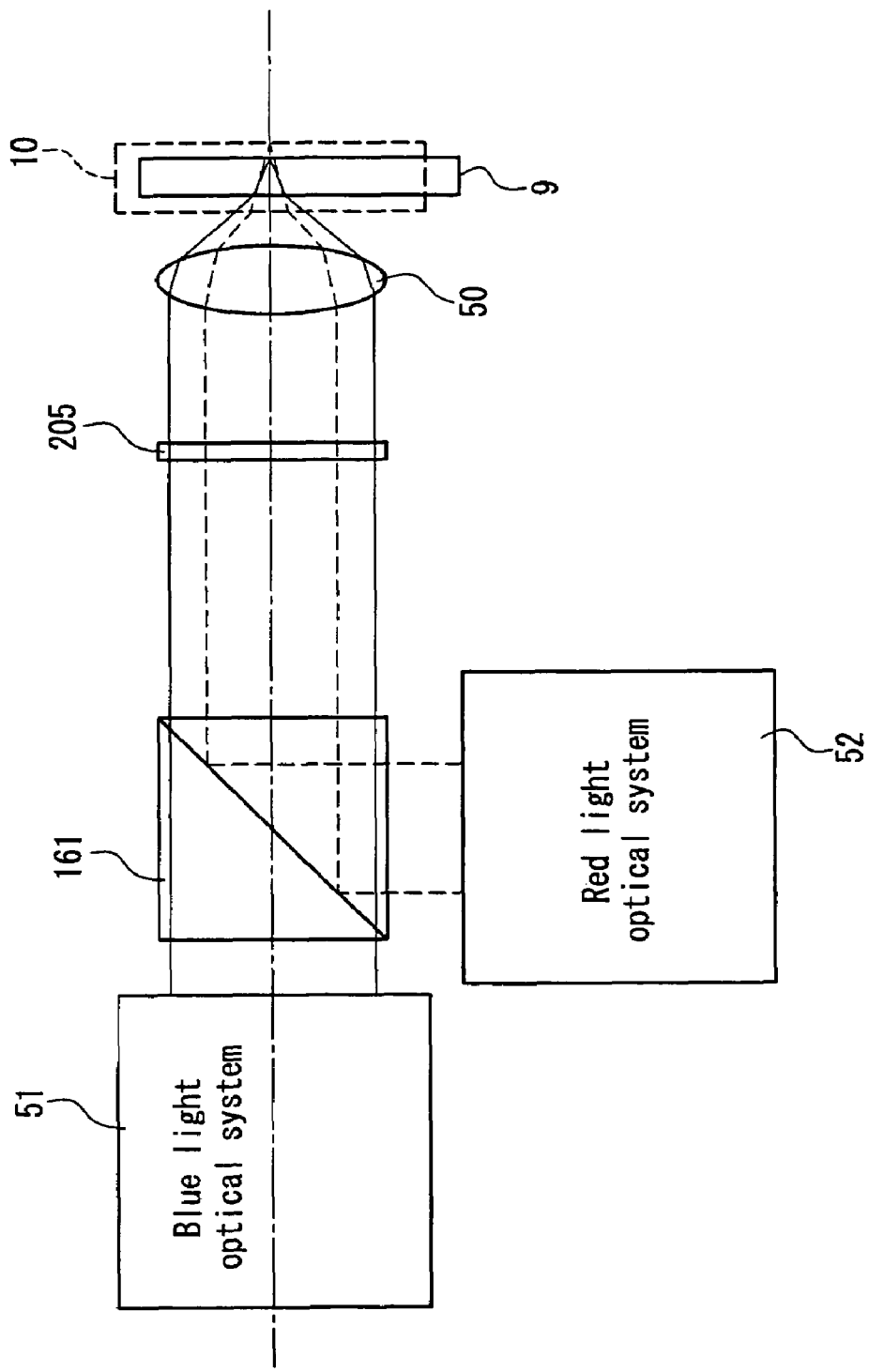
FIG. 12 is a cross-sectional diagram that schematically shows another conventional optical head.
Figure 13A:
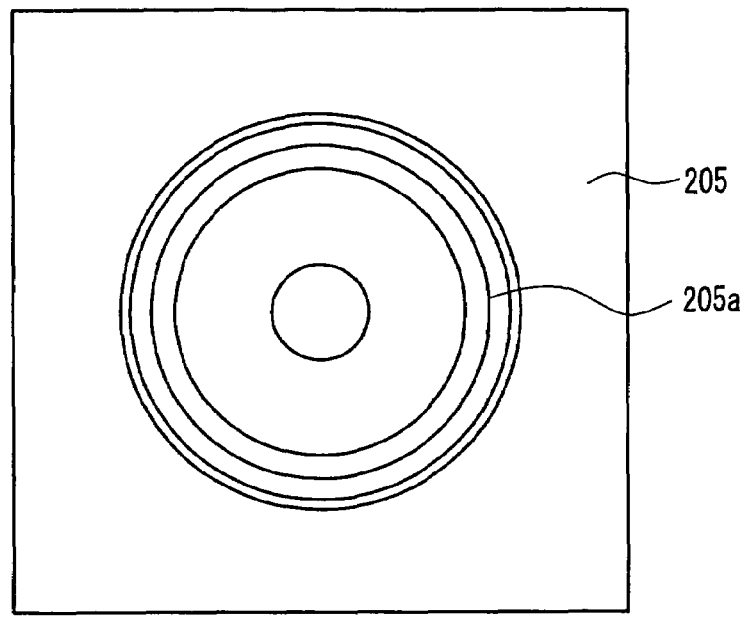
FIG. 13A is a plan view that schematically shows the configuration of the primary components of yet another conventional optical head device.
Figure 13B:
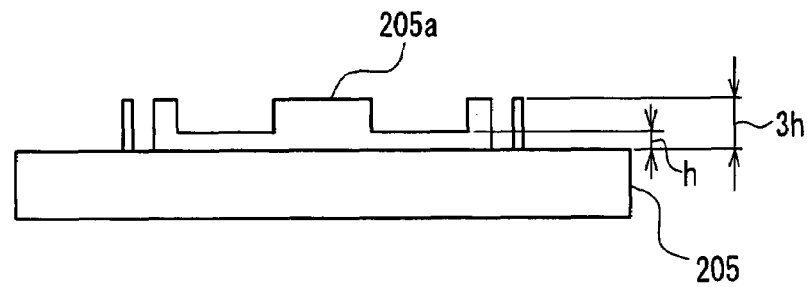
FIG. 13B is a cross-sectional view thereof.
Figure 14:
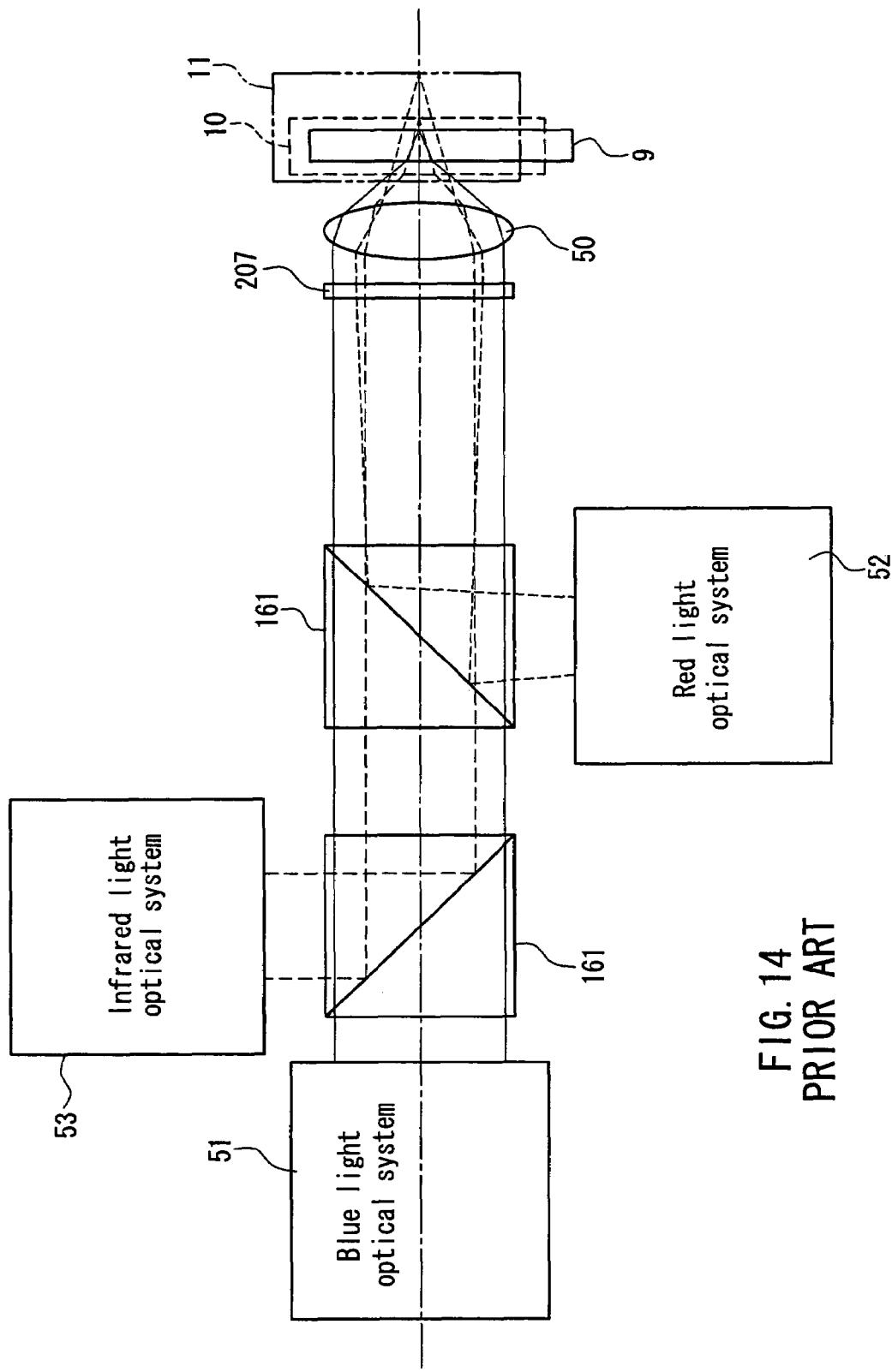
FIG. 14 is a cross-sectional diagram that schematically shows yet another conventional optical head.

A sixth embodiment is described using FIG. 10. In FIG. 10, the optical information device 67 is the optical information device described above in the second embodiment. An input/output element 69 is a wired or wireless input/output element for receiving information to be recorded to the optical information device 67 and for outputting information read by the optical information device 67 to the outside. Thus, it is possible to exchange information over a network, that is, with a plurality of devices, such as a computer, a telephone, and a television tuner, and to use the device as a common information server (optical disk server) for the plurality of devices. Because is can stably record to and reproduce from different types of optical disks, it can be used for a wide array of applications. It is also possible to provide an output device 81 such as a cathode ray tube, a liquid crystal display device, or a printer, for displaying information.

By further providing a changer 131 through which a plurality of types of optical disks are inserted into and removed from the optical information device 67, it is possible to obtain the effect that a large amount of information can be recorded and stored.

It should be noted that in the above third through sixth embodiments, FIGS. 7 to 10 showed an output device 81 and a liquid crystal monitor 120, but is it also possible for the optical information device to be provided with output terminals and for it not to include the output device 81 and the liquid crystal monitor 120, and instead for them to be sold separately. Also, although an input device is not shown in FIG. 8 or FIG. 9, it is also possible to adopt a product format in which an input device such as a keyboard, a touchpad, a mouse, or a remote control device is also provided. Conversely, in the above fifth and sixth embodiments, it is also possible to adopt a format in which the output device is sold separately and only the input device is included.

In the second embodiment, the optical head device according to the first embodiment is used as the optical head device, and thus it is possible to achieve the excellent effect that with a single head device, compatibility with a plurality of types of optical disks with different recording densities can be achieved.

Also, in the third through sixth embodiments, computers, optical disk players, optical disk recorders, optical disk servers, and car navigation systems provided with the above-described optical information device according to the second embodiment or that employ the foregoing recording and reproducing method, are capable of stably recording to and reproducing from different types of optical disks, and thus have the effect that they can be employed in a wide array of applications.

The present invention can be adopted for optical head devices and optical information devices (optical information devices) for recording, reproducing, and erasing information stored on an optical information medium such as an optical disk, recording and reproducing methods of optical information devices, systems in which the same are adopted, and objective lenses, diffraction elements, and composite objective lenses, in which an objective lens and a diffraction element are combined, used in the optical head devices.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. An optical head device, comprising:
   a blue laser light source for emitting a blue light beam;
   an infrared laser light source for emitting an infrared light beam;
   an objective lens for receiving light beams emitted from the blue laser light source and the infrared laser light source and focusing then into a spot on a recording surface of an optical disk; and
   an optical detector in which is formed an optical detector portion for receiving a light beam reflected by the recording surface of the optical disk and outputting an electric signal that corresponds to a light amount of the light beam;
   wherein, due to the objective lens, the blue light beam emitted by the blue laser light source is focused into a spot on the recording surface of an optical disk after passing through a substrate having thickness t1, wherein t1 is approximately 0.1 mm or less;
   wherein a relay lens is disposed between the infrared laser light source and the objective lens;
   wherein the infrared light beam emitted from the infrared laser light source is converted by the relay lens so that the infrared light beam exiting the relay lens converges to have a smaller diameter than the infrared light beam incident on the relay lens and then, as the infrared light beam diverges once again, the infrared light beam is incident on the objective lens, and the objective lens focuses the infrared light beam into a spot on the recording surface of an optical disk, after passing through an approximately 1.2 mm substrate;
   wherein the objective lens is a compound objective lens composed of a hologram and a refractive lens;
   wherein the hologram comprises a grating having a sawtooth cross-sectional shape formed on at least an inner circumferential portion;
   wherein a depth h1 of the sawtooth cross-sectional shape is
      a depth that generates a positive second-order diffraction light by providing a light path difference of approximately two wavelengths with respect to a first light beam having wavelength $\lambda 1$ in the range of 390 nm to 415 nm, and
      a depth that generates a positive first-order diffraction light with respect to a second light beam having wavelength $\lambda 2$ in the range of 630 nm to 680 nm;
   wherein the hologram has a convex lens form so that if the first light beam is focused passing through a substrate having thickness t1, the first light beam is subjected to a convex lens effect by the hologram, a change in a focal length is reduced if the wavelength $\lambda 1$ changes by about several nm;
   wherein the positive second-order diffraction light of the first light beam is focused after passing through a substrate having thickness t1, and the positive first-order diffraction light of the second light beam that passes through the inner circumferential portion of the hologram is focused after passing through a substrate having thickness t2;

wherein t1<t2; and wherein if the first light beam is focused passing through a substrate having thickness t1, then by having the hologram exert a greater convex lens effect than if the second light beam that passes through the inner circumference portion of the hologram is focused passing through a substrate having thickness t2, or by having the hologram exert a smaller convex lens effect when the second light beam that passes through the inner circumference portion of the hologram is focused passing through a substrate having thickness t2 than when the first light beam is focused passing through a substrate having thickness t1, a focal position on an optical disk side is moved away from the compound objective lens.

2. The optical head device according to claim 1, wherein the relay lens adds spherical aberration at its outer circumference portion away from an optical axis, and due to the spherical aberration, corrects off-axial aberration.

3. The optical head device according to claim 1, wherein a distance between the relay lens and a point of convergence on a side opposite a point of emission of the infrared light beam is shorter than a distance between the relay lens and the point of emission of the infrared light beam.

4. The optical head device according to claim 1, further comprising:

a dichroic element, for separating the infrared light beam and shorter wavelength light beams, between the relay lens and the objective lens.

5. The optical head device according to claim 4, wherein a dichroic film for separating the infrared light beam and shorter wavelength light beams is formed on a surface of a parallel flat plate provided in the dichroic element disposed between the relay lens and the objective lens.

6. The optical head device according to claim 5, wherein a thickness of the parallel fiat plate is 1 mm or less.

7. The optical head device according to claim 4, wherein the dichroic element is disposed at a position where the blue light beam is a substantially parallel light beam.

8. The optical head device according to claim 1, wherein positive first-order diffraction light of the second light beam that passes through an outer circumferential portion of the hologram has aberration when it has passed through a substrate having thickness t2, and is not focused.

9. The optical head device according to claim 1, wherein when focusing the second light beam onto the recording surface of the optical disk after passing through a substrate having thickness t2, a collimating lens for turning the second light beam that is emitted from the second light source into substantially parallel light is moved toward the second light source so that the second light beam is turned into slightly diverged light and made incident on the objective lens, moving the focal position on the optical disk side away from the compound objective lens.

10. The optical head device according to claim 1, further comprising:

a phase step in which is formed a step difference that causes a light path length difference of five times the wavelength with respect to the blue light beam and three times the wavelength with respect to the second light beam.

11. The optical head device according to claim 1, wherein the hologram and the objective lens are fixed as a single unit.

12. The optical head device according to claim 1, wherein the hologram is formed integrally with the surface of the objective lens.

13. An optical information device comprising:

an optical head device;

a motor for rotating an optical disk; and an electric circuit for receiving signals obtained from the optical head device, and based on the signals, for controlling and driving the motor and the objective lens and the laser light sources of the optical head device;

wherein the optical head device is the optical head device according to claim 1.

14. An optical information device comprising:

an optical head device;

a motor for rotating an optical disk; and an electric circuit for receiving signals obtained from the optical head device, and based on the signals, for controlling and driving the motor and the objective lens and the laser light sources of the optical head device;

wherein the optical head device is the optical head device according to claim 9, and wherein different types of optical disks are distinguished between, and the collimating lens is moved toward the second light source in the case of optical disks whose substrate thickness is 0.6 mm.

15. A computer comprising:

an optical information device;

an input device or an input element for inputting information;

a computing device for carrying out computing based on information input from the input device or information reproduced from the optical information device; and an output device or an output element for displaying or outputting information input from the input device, information reproduced from the optical information device, or the results of the computation performed by the computing device;

wherein the optical information device is the optical information device according to claim 13.

16. An optical disk player comprising:

an optical information device, and a decoder for converting into an image information signals obtained from the optical information device from information to be converted into an image;

wherein the optical information device is the optical information device according to claim 13.

17. A car navigation system comprising:

an optical information device, and a decoder for converting into an image information signals obtained from the optical information device from information to be converted into an image;

wherein the optical information device is the optical information device according to claim 13.

18. An optical disk recorder comprising:

an optical information device, and an encoder for converting into information image information from an image to be converted into information to be recorded by the optical information device;

wherein the optical information device is the optical information device according to claim 13.

19. An optical disk server comprising:
an optical information device, and
an input/output element for exchanging information with the outside;
wherein the optical information device is the optical information device according to claim 13.

* * * * *